United States Patent
Sachtleben et al.

(10) Patent No.: US 11,574,493 B1
(45) Date of Patent: Feb. 7, 2023

(54) IMAGE DATA EXTRACTION FOR TRANSACTION MANAGEMENT

(71) Applicant: United Services Automobile Association (USAA), San Antonio, TX (US)

(72) Inventors: Justin Sachtleben, San Antonio, TX (US); Cisco Iguaran, San Antonio, TX (US); Annette Mumme, San Antonio, TX (US); Jonathan Dennis Velazquez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/374,590

(22) Filed: Jul. 13, 2021

Related U.S. Application Data

(63) Continuation of application No. 17/082,900, filed on Oct. 28, 2020, now Pat. No. 11,068,709, which is a continuation of application No. 16/748,404, filed on Jan. 21, 2020, now Pat. No. 10,824,855, which is a continuation of application No. 15/844,995, filed on Dec. 18, 2017, now Pat. No. 10,504,241.

(60) Provisional application No. 62/452,860, filed on Jan. 31, 2017.

(51) Int. Cl.
*G06K 7/14* (2006.01)
*G06Q 20/10* (2012.01)
*G06V 30/413* (2022.01)
*G06Q 40/02* (2012.01)

(52) U.S. Cl.
CPC ......... *G06V 30/413* (2022.01); *G06K 7/1443* (2013.01); *G06Q 20/102* (2013.01); *G06Q 40/02* (2013.01)

(58) Field of Classification Search
CPC .......................... G06K 7/1443; G06Q 20/102
USPC ........................................................ 235/379
See application file for complete search history.

(56) References Cited

U.S. PATENT DOCUMENTS

| | | | |
|---|---|---|---|
| 5,699,528 A | 12/1997 | Hogan | |
| 5,913,202 A | 6/1999 | Motoyama | |
| 6,871,220 B1 | 3/2005 | Rajan et al. | |
| 7,080,035 B1 * | 7/2006 | Williams | G06Q 20/102 |
| | | | 705/40 |

(Continued)

OTHER PUBLICATIONS

About Yodlee, Press Room, Yodlee Inc., [online], [retrieved from the internet on Jun. 14, 2007 using <URL: http://corporate.yodlee.com/company/press_room/previous/2006/09/onlinebillpay.html>.

(Continued)

*Primary Examiner* — Toan C Ly
(74) *Attorney, Agent, or Firm* — Fletcher Yoder, P.C.

(57) ABSTRACT

Techniques are described for migrating information from a first account to a second account, based on analyzed image(s) of document(s). Image(s) of a document may be generated using an image capture device of a smartphone or other portable computing device. The image(s) may be analyzed, through pattern recognition analysis or barcode scanning, to extract the information from the image(s). The information may then be employed to schedule a transaction, such as payment of a bill described in the information. In some instances, the extracted information may be used as part of an account migration process, in which transactions are migrated from a first account to a second account.

20 Claims, 22 Drawing Sheets

(56) References Cited

U.S. PATENT DOCUMENTS

| | | |
|---|---|---|
| 8,001,045 B1 | 8/2011 | McClinton |
| 8,392,300 B1 | 3/2013 | Battula et al. |
| 2003/0225688 A1 | 12/2003 | Dobbins |
| 2004/0034594 A1 | 2/2004 | Thomas et al. |
| 2004/0193537 A1 | 9/2004 | Knapp |
| 2005/0021456 A1 | 1/2005 | Steele et al. |
| 2006/0106696 A1 | 5/2006 | Carlson et al. |
| 2006/0116949 A1 | 6/2006 | Wehunt et al. |
| 2008/0015982 A1 | 1/2008 | Sokolic et al. |
| 2013/0022231 A1* | 1/2013 | Nepomniachtchi .... G06V 10/28 382/229 |
| 2014/0095389 A1 | 4/2014 | Caldwell |
| 2014/0379584 A1 | 12/2014 | Ward |
| 2015/0142650 A1 | 5/2015 | Johnston et al. |

OTHER PUBLICATIONS

Intuit CustomerCentral AccountSwitch, Intuit Inc. [online], [retrieved from the internet on Jul. 19, 2007 using <URL: http://customercentral.intuit.com/prodsvc/accountswitch.shtml>.

* cited by examiner

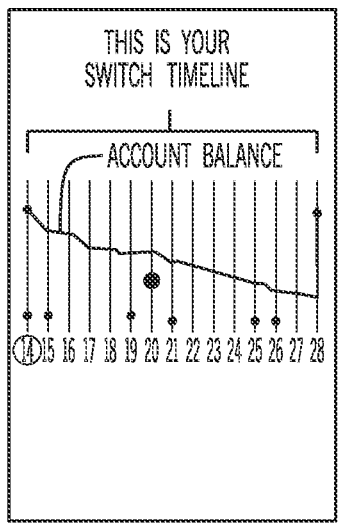 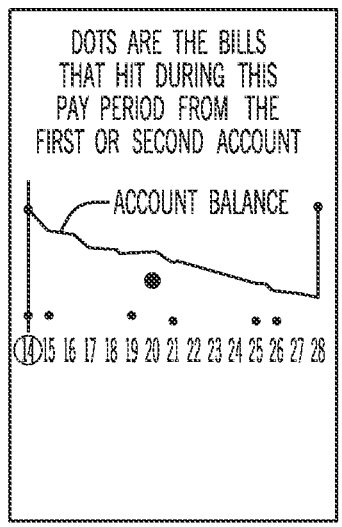 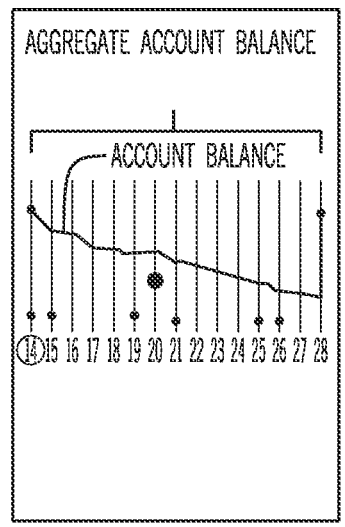
FIG. 2A        FIG. 2B        FIG. 2C
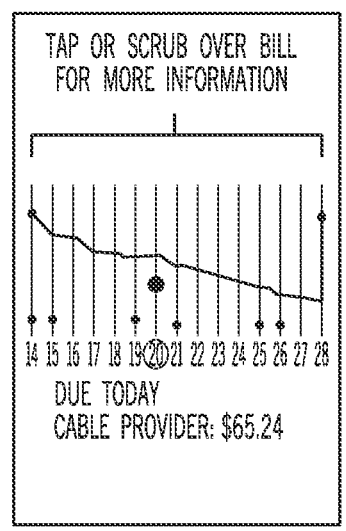 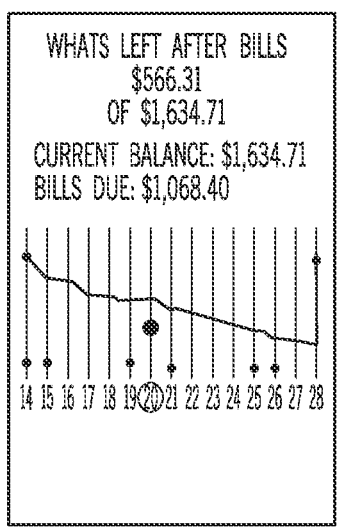
FIG. 2D        FIG. 2E

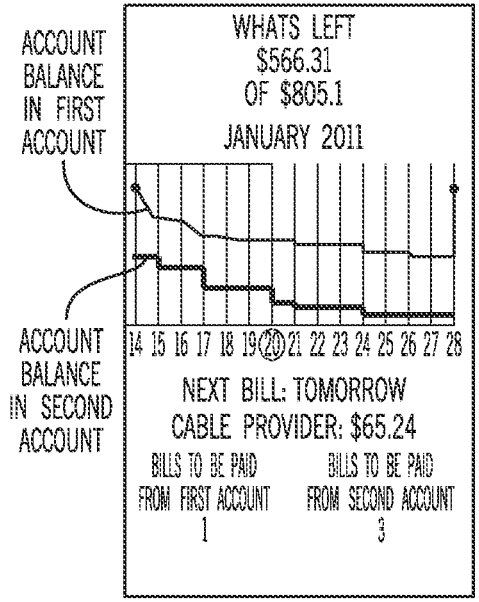
FIG. 4A
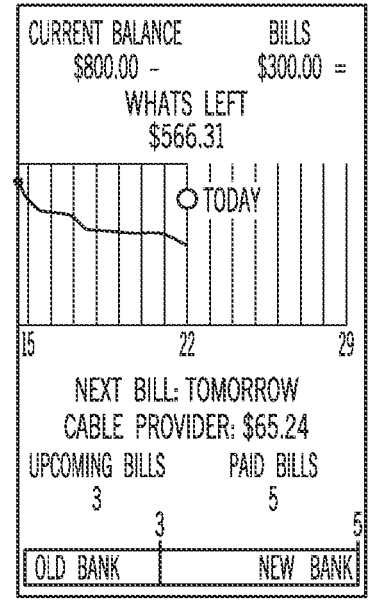
FIG. 4B
FIG. 4C

# IMAGE DATA EXTRACTION FOR TRANSACTION MANAGEMENT

CROSS-REFERENCE TO RELATED APPLICATION

This application is a continuation of U.S. patent application Ser. No. 17/082,900, titled "Image Data Extraction for Transaction Management," filed on Oct. 28, 2020, which is a continuation of continuation of U.S. patent application Ser. No. 16/748,404, titled "Image Data Extraction for Transaction Management," filed on Jan. 21, 2020, which is a continuation of U.S. patent application Ser. No. 15/884,995, titled "Image Data Extraction for Transaction Management," filed on Jan. 31, 2018, which claims the benefit of U.S. Provisional Patent Application No. 62/452,860, titled "Image Data Extraction for Account Migration," which was filed on Jan. 31, 2017, the entireties of which are incorporated by reference into the present disclosure for all purposes.

BACKGROUND

Traditionally, migration of account information from one account to another is time-consuming and prone to errors. Errors in migration may lead to the loss of information, late transactions, and/or other problems that may be costly to correct. During the period of transition, computing systems that manage the old and/or new accounts may exhibit problems associated with insufficient funds, confusion in the source and/or destination account(s) to be used in transactions, late transactions, and other technical issues.

SUMMARY

Implementations of the present disclosure are generally directed to determining information based on analysis of image(s) of a document, such as a bill. More specifically, implementations are directed to analyzing document image(s) to identify a transaction made against a first account, such as a bill paid regularly or semi-regularly from the first account, and migrate the transaction from the first account to a second account.

In general, innovative aspects of the subject matter described in this specification can be embodied in methods that include operations of: receiving at least one image of a physical document, the at least one image captured by an image capture device; analyzing the at least one image to identify information that is present on the physical document, the information including a payee identifier of a payee, wherein the analyzing of the at least image includes comparing the at least one image to a model that has been previously determined for the payee, the model indicating, for each of at least one location in the physical document, a respective information element to be extracted from the respective location in the at least one image; and scheduling, based on the information, at least one transaction to be performed over a network, the at least one transaction including a payment from a payor account of a payee to a payee account of the payee.

Implementations can optionally include one or more of the following features: the information further includes one or more of an account number of the payor, an amount due, and a due date for paying the amount due; analyzing the at least one image further includes using at least one of optical character recognition (OCR) and intelligent character recognition (ICR) to extract the information from the at least one image; the physical document includes a barcode that encodes at least a portion of the information; analyzing the at least one image includes scanning the barcode in the at least one image to decode the encoded information; the information describes a recurring payment that is made to the payee; the scheduling of the at least one transaction included in a charge migration to cause future instances of the at least one recurring charge to be made against the payor account; the charge migration further includes communicating with an interface of the payee to indicate that at least one future instance of a recurring charge is to be made against the payor account instead of another account; analyzing the model is developed using machine learning; analyzing the at least one image includes providing the at least one image as input to the model, which has been trained to predict the information based on the at least one image, and receiving the predicted information as output from the model; the operations further include presenting the predicted information in a user interface (UI); the operations further include receiving, through the UI, a confirmation or modification of each element of the predicted information; and/or the modification of an element of the predicted information is employed to refine the model.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. By migrating charge(s) and payment(s) from a first account to a second account in a controlled manner while monitoring the balances in both accounts, implementations improve the performance of computing systems that manage account migration. In traditional systems that handle manual account migration operations, errors in the scheduling of payments and/or transfer of funds may lead to missed payments, late payments, account overdrafts, missing funds, and/or other problems. Each of these problems may require operations to be executed to address the problem, such as rolling back transactions and/or funds transfers, analyzing transaction history to determine where funds were erroneously sent, and so forth. By providing an automated, reliable process for account migration, implementations avoid such problems exhibited by traditional systems. Accordingly, implementations avoid the expenditure of processing resources, memory, storage capacity, network bandwidth, and/or other computing resources that traditional systems must use to respond to problems in account migration.

Moreover, by analyzing image(s) of a bill to determine bill information to use in scheduling payment of the bill, implementations provide a more reliable technique for determining bill information, compared to traditional systems in which a user may be required to manually enter bill information into a web form or other user interface. Accordingly, implementations avoid the expenditure of processing resources, memory, storage capacity, network bandwidth, and/or other computing resources that traditional systems expend in recovering from errors in entering bill information, such as requesting that the user re-enter the information, re-transmitting and/or re-storing the information in memory, and so forth.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 2A-2E depict an example user interface presenting a tutorial describing account migration, according to implementations of the present disclosure.

FIGS. 4A-4C depict an example user interface for account migration, according to implementations of the present disclosure.

DETAILED DESCRIPTION

Figure 1A:
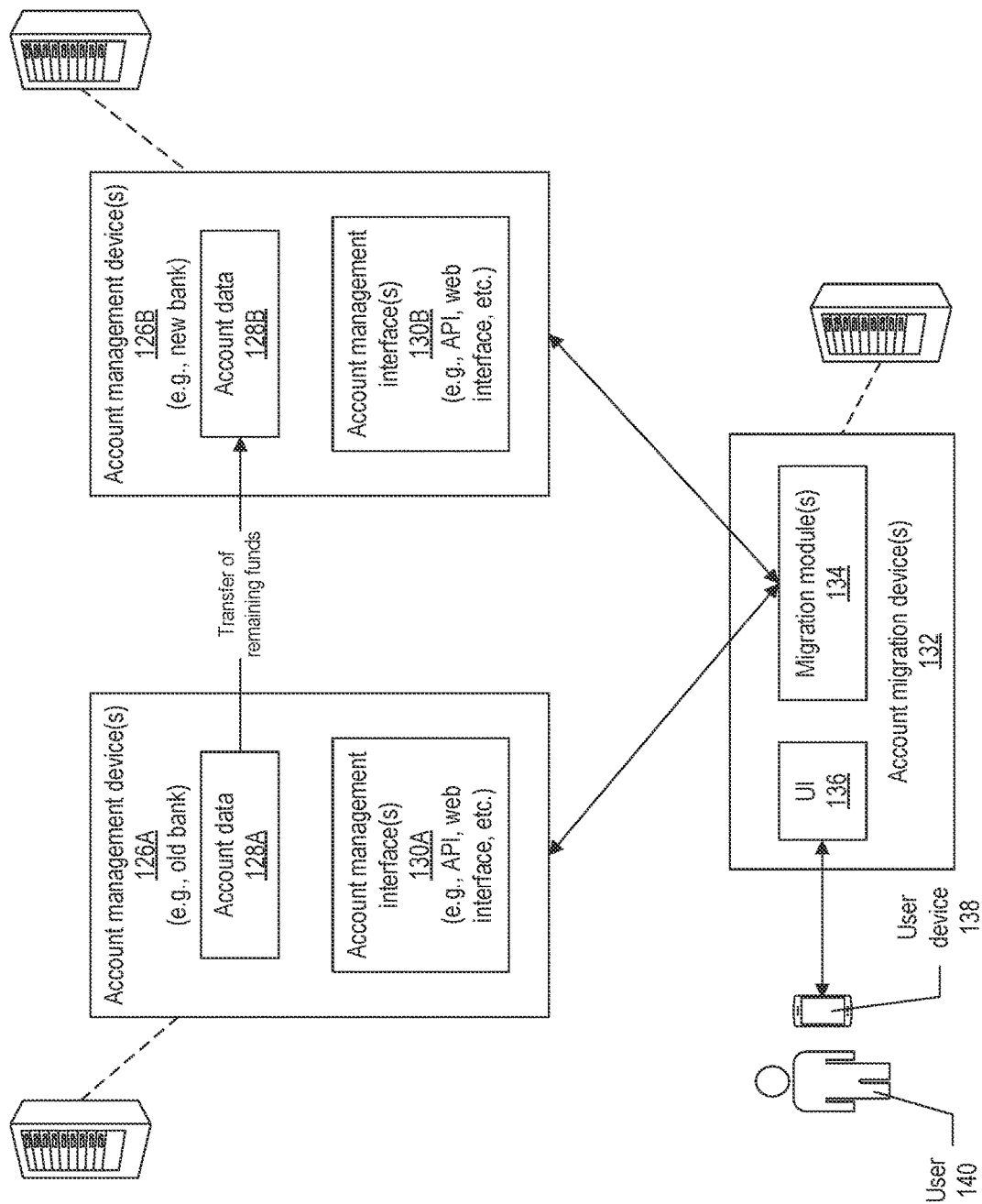
FIG. 1A depicts an example system for account migration, according to implementations of the present disclosure.

Implementations of the present disclosure are directed to systems, devices, methods, and computer-readable media for analyzing an image of a physical document, such as a bill, bank statement, loan statement, or other document, extracting information from the image of the document, and using the extracted information to initiate or schedule a transaction, such as a payment of a bill. Generating an image of a physical document (e.g., using a camera of a smartphone or other portable computing device) and analyzing the image to determine information that is present in the document, is also described herein as scanning the document. In some implementations, a camera is used to capture one or more images of a physical document, and the image(s) are analyzed to identify information present in the image(s). For example, image(s) of a utility bill may be analyzed to determine information such as the name and address of the biller, an amount due, an account number of the user (e.g., who is to pay the bill), a due date for the amount due, and so forth. Such information can then be used to schedule the payment of a bill by scheduling a financial transaction to be performed to transfer the amount due (or some other amount) from a bank account of the user to another account of the biller. In some instances, the information extracted from the bill may be used to initiate a payment at that time, instead of or in addition to scheduling a payment for a later time. The transaction to pay the bill may be performed as a push of funds from the user's account to the biller's account (e.g., performed by the user's bank), or as a pull of funds into the biller's account from the user's account (e.g., performed by the biller's bank).

In some instances, the information extracted from the document may also be used to add the biller (or other payee) to a list of payees whose bills or other payments are to be managed through a bill-paying service provided by the user's financial institution. Accordingly, following an initial scan of a bill, through which the payee information is determined and added to the list of payees managed through the service, a user may not need to scan a subsequent bill and may use the bill payment service to specify that a payment be made to the previously set up payee.

In some implementations, the analysis of a document may include comparing the image(s) of the document to a previously established template or format that describes a typical layout of a document from a particular payee. For example, a payee may use a standard form for their bills, with certain items of information (e.g., account number, amount due, due date, etc.) in the same location across multiple bills. In such instances, extraction of the information from the document may include analyzing the text of the document at the particular locations where the information is located (e.g., using optical character recognition or other suitable technique) and determining the alphanumeric text data that is present at those locations on the document. If certain items of information cannot be extracted automatically with sufficient confidence or accuracy, in some instances the user may be prompted to enter the information into a user interface, and/or verify that the extracted information is correct. User input in such instances may be used to refine the model (e.g., template, format) for data extraction, to enable subsequently performed automatic data extraction to be performed more reliably. In some implementations, the analysis of document image(s) to extract information may employ one or more suitable machine learning techniques. For example, machine learning may be employed to train a model to predict the information in a document (e.g., account number, amount due, due date, etc.) based on input image(s) of the document. In such instances, the input provided by the user to modify and/or verify information elements predicted by the model may then be used to further retrain or otherwise refine the model for more accurate predictions in the future.

In some implementations, the information determined based on a scan of a bill or other physical document may be used in managing the migration of funds and transactions from one account to another account. As used herein, an account may be a financial account such as a bank account (e.g., savings, checking, money market, etc.), investment account, or other type of account. An account may store any amount of funds in any currency, or other types of value such as reward points. An account may be associated with one or more customer(s). Transactions may include charges against an account, such as a bill payment or other transfer of funds from the account (e.g., a debit against the account). Transactions may also include payments into an account, such as a deposit of funds into the account (e.g., a credit to the account). Account migration may include migration of transactions, such as charges and/or payments, from a first account to a second account. Migrating a charge may include operation(s) to cause the charge to be paid out of the second account instead of the first account. Migrating a payment may include operation(s) to cause the payment to be received into the second account instead of the first account. Account migration may also include the transfer of funds from the first account to the second account and, in some instances, closing the first account.

FIG. 1A depicts an example system for account migration, according to implementations of the present disclosure. In the example of FIG. 1A, the system may include one or more account management devices 126A and one or more account management devices 126B. The account management device(s) 126A may manage a user's first financial account (e.g., an old account) from which funds and transactions are to be migrated. The first financial account may be described by account data 128A that is accessible to and managed by processes executing on the account management device(s) 128A. The account management device(s) 126B may manage a user's second financial account (e.g., a new account) to which funds and transactions are to be migrated. The second financial account may be described by account data 128B that is accessible to and managed by processes executing on the account management device(s) 128B. The account management device(s) 126A and 126B may include any suitable number and type of computing devices, such as server computers, distributed computing devices (e.g., cloud servers), front-end servers, back-end servers, and so forth.

The account management device(s) 126A may expose or otherwise provide one or more account management interfaces 130A. The account management device(s) 126B may expose or otherwise provide one or more account management interfaces 130B. The account management interface(s) 130A and 130B may enable external entities, such as processes, users, and so forth, to access, modify, and/or request transaction(s) to be performed with respect to account(s). In some instances, the interface(s) 130A and 130B may provide access to those entities that provide the appropriate credentials for account access. For example, to access a user's account, a requesting entity may be required to provide the appropriate security credentials for the user such as one or more of a login, password, personal identification number (PIN), challenge question answer(s) (e.g., "what is your mother's maiden name?"), biometric information, and so forth. In some instances, the interface(s) 130A and 130B may include one or more application programming interfaces (APIs) that an external process may access to request account information, funds transfers, deposits, payments, and/or changes to the account. In some instances, the interface(s) 130A and 130B may include one or more user interfaces (UIs) such as web interfaces or other types of graphical user interface(s). A user may access the interface (s) to view account information, request funds transfers, pay bills, change personal information (e.g., address information), and so forth. The interface(s) may also be accessed by automatic external processes to perform such operations.

The system may include one or more account migration devices 132. The account migration device(s) 132 may include any suitable number and type of computing devices. The account migration device(s) 132 may execute one or more migration modules 134 that perform operations to manage the migration of funds and/or transactions from the old account to the new account. Such operations are described further with reference to FIGS. 1B and 1C. The account migration device(s) 132 may also provide a UI 136. The UI 136 may be presented through a user device 138 to enable a user 140 to view information regarding the old and/or new accounts, and to view information describing the status of the migration process. The UI 136 is described further with reference to FIGS. 2-11. The UI 136 may also be described as a dashboard.

Figure 1B:
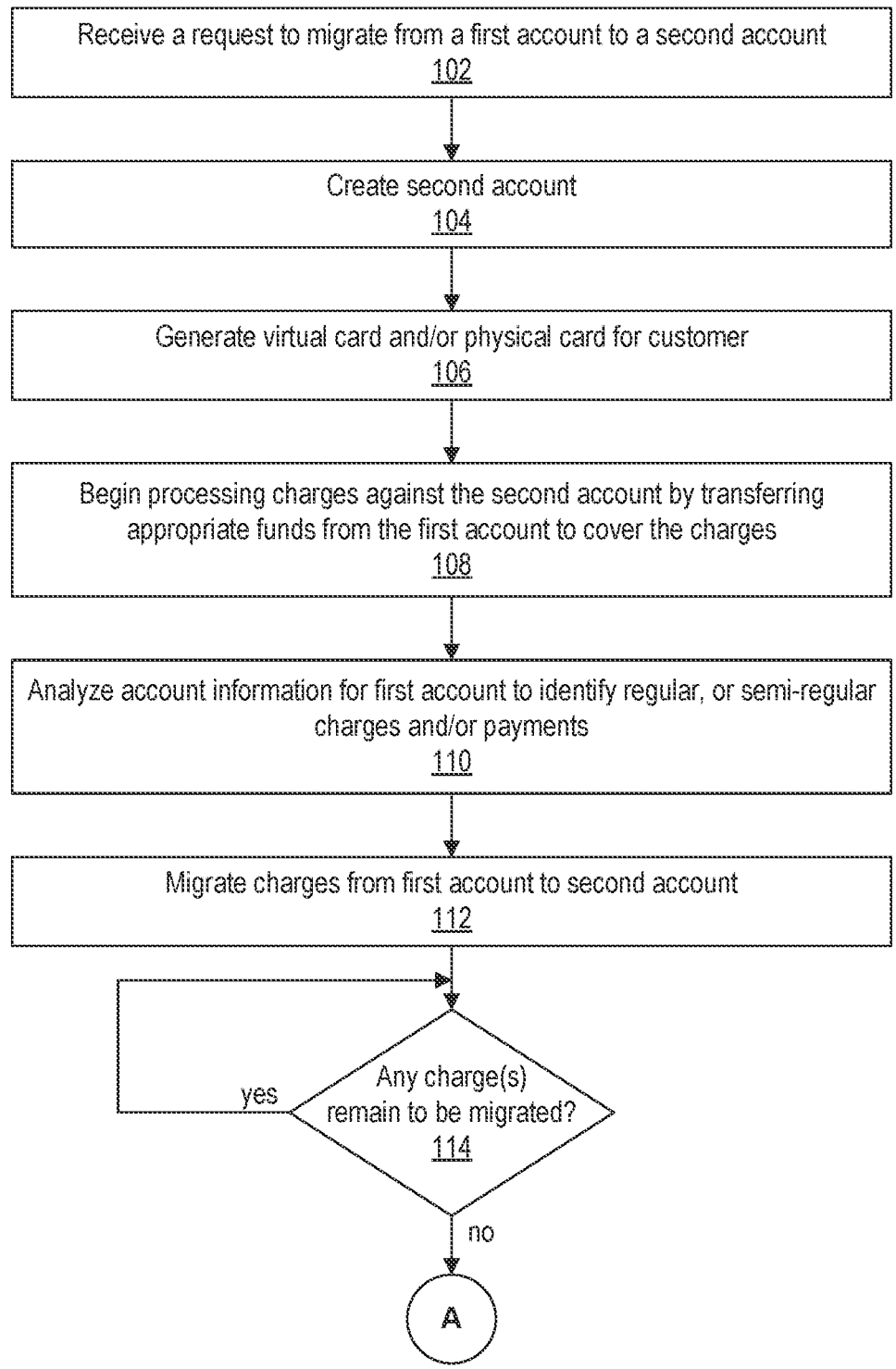
FIGS. 1B and 1C depict a flow diagram of an example process for migrating funds and transactions from a first account to a second account, according to implementations of the present disclosure.
Figure 1C:
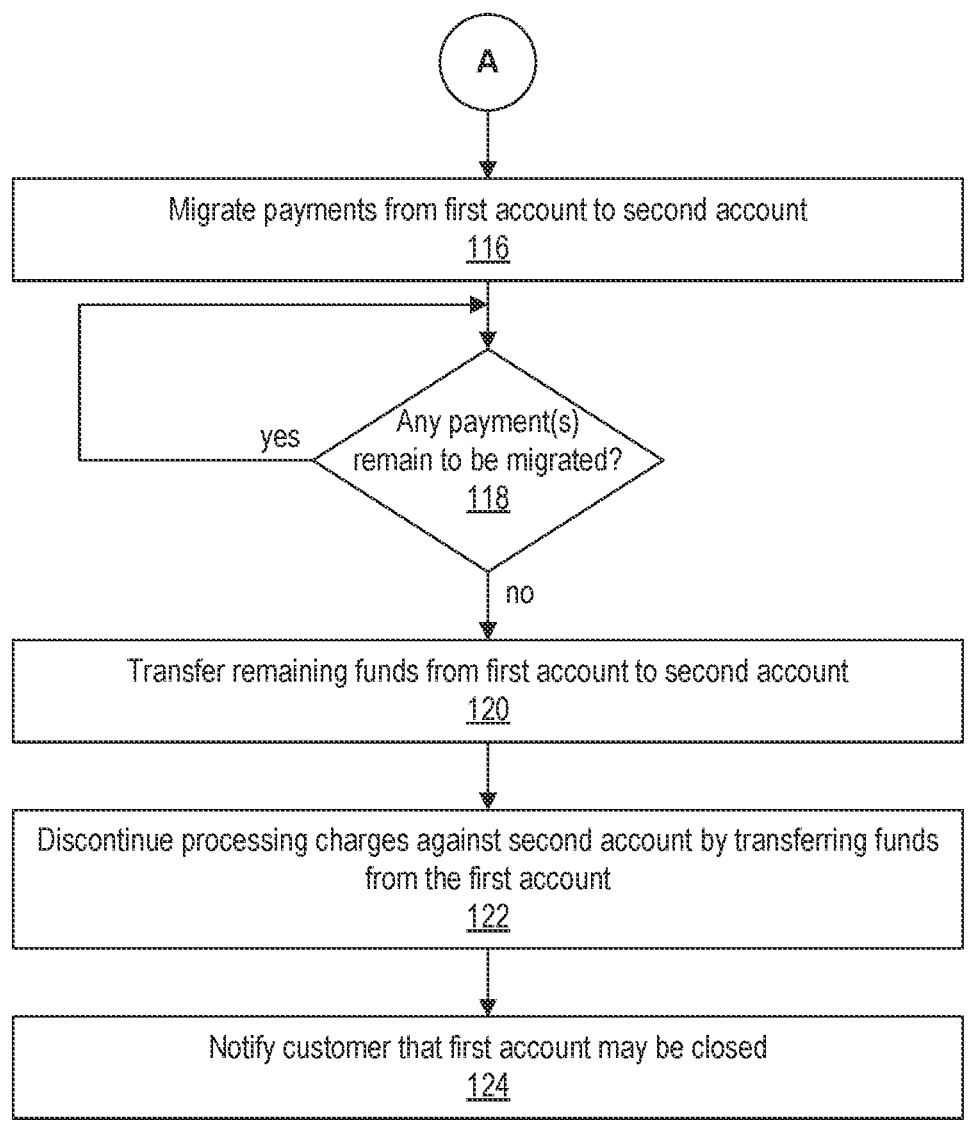

FIGS. 1B and 1C depict a flow diagram of an example process for migrating funds and transactions from a first account to a second account, according to implementations of the present disclosure. Operations of the process may be performed by one or more of the migration module(s) 134, the UI 136, and/or other software module(s) executing on the user device 138, the account migration device(s) 132, the account management device(s) 126A, the account management device(s) 126B, and/or other device(s).

As shown in FIG. 1B, in some implementations a request is received (102) indicating that a first account is to be migrated, at least in part, to a second account. The request for account migration may be received from a customer (e.g., user 140) associated with the first account. The request may indicate that a second account is to be created for the customer, or the request may indicate a second account that has already been created. In some examples, the first and second accounts are at different financial institutions such as banks, credit unions, investment management services, and so forth, and implementations may facilitate a customer transferring their banking, investments, or other financial services business from a first financial institution to a second financial institution. In some implementations, the request for account migration may be submitted by a user (e.g., customer) using an application executing on a computing device, such as a smartphone, tablet computer, wearable computer, laptop computer, desktop computer, or any other type of computing device. The application may be a web application that executes at least partly in a browser on the user device 138, or that executes in some other container for dynamic and/or static web content. The application may also be a (e.g., native) application that executes outside a browser on the user device 138.

The customer may be prompted, e.g., via the application, to provide account information regarding the first account. For example, the customer may be prompted to provide a name of the financial institution for the first account, the account number, a debit and/or credit card number, and/or other information. In some instances, a list of commonly used financial institutions may be presented, to enable the customer to select their financial institution from the list. The customer may also be prompted to provide access credentials, security information, and/or authentication information for the first account, such as one or more of a PIN, a username, a password, an answer to a knowledgebased question (e.g., "what is your mother's maiden name?"), or other information. The credentials, security information, or authentication information may enable implementations to access the first account information and perform migration operations as described herein. In some instances, the customer may enter account information for the first account, and/or for the second account if it is already created, through the UI 136. The customer may enter credentials, account numbers, account names, and so forth manually through text and/or numeric entry fields of the UI 136. In some implementations, the UI 136 may be configured to receive account information that is entered by scanning or otherwise taking and analyzing an image of a bank card.

In response to the request for account migration, the second account may be created (104) for the customer if the second account does not already exist. In some implementations, a debit card and/or a credit card may be provisioned or otherwise generated (106) for the customer, and the card(s) may be associated with the second account. Account creation may include generating a new account number to uniquely identify the newly created account. Card creation may include generating a new card number that is uniquely associated with the card. The card number may be the same as, or different from, the account number. Other information may also be generated for the card, such as expiration date, a card verification value (CVV) or other security code, a PIN, and so forth. In some implementations, the created card may be a virtual card that may be used online to conduct business with e-commerce applications or other online services. The virtual card may also be used for virtual payments through a mobile payment and/or digital wallet system that enables users to make payments through a mobile device such as a smartphone. The created card may be a physical card that may be carried by the customer and used to make purchases in stores or other businesses. In some implementations, both a virtual card and physical card may be created. In some examples, the virtual card may be created first and provided to the customer in response to the request for the second account, to enable the customer to (e.g., immediately) begin using the new account for online purchases or other purposes.

Implementations may begin processing (108) charges made against the second account, after the second account has been created and associated with the first account. In some implementations, the new virtual card and/or new account number may be associated with another (e.g., older) card that draws from the first account, such that purchases made using the new card are automatically processed as if they were made with the old card. For example, purchases made with the new card may trigger a charge against the first account using the old card. In some implementations, purchases made with the new card may be paid out of the new account, and funds may be transferred from the old account to the new account to enable the charges to be paid from the new account.

The second (e.g., new) account may be associated with the first account. After the accounts are associated, the customer may begin making purchases or other transactions with the new card, or otherwise using the second account. Transactions made using the second account may automatically trigger funds transfers from the first account to the second account. For example, in response to the customer using the new card to purchase $40 worth of groceries, implementations may automatically cause a transfer of at least $40 from the first account to the second account to enable the $40 charge to be settled from the second account.

Funds may be pulled in this manner from the first account to the second account in real time, or within a short period of time following the charge(s) made to the second account. In some implementations, the transfers of funds from the first account to the second account (e.g., made to handle charges against the second account) may be consolidated into a single transfer (e.g., per day) instead of multiple transfers, to reduce the cost of transfer fees and/or to gain efficiency in processing. After the second account is created, the customer may begin transacting as if all the funds in the first account were actually in the second account, even though at least some of the funds may still remain in the first account until migration is complete.

After the second account is created and associated with the first account, implementations may access and analyze (110) the account information for the first account. Such analysis may identify recurring charges (e.g., debits, withdrawals, outgoing transfers) made to remove funds from the first account. Implementations may also identify recurring payments (e.g., credits, deposits, incoming transfers) made to add funds to the first account. Each identified recurring charge, and each identified recurring payment, may be migrated from the first account to the second account. In some implementations, the recurring charges may be migrated to the second account prior to the migration of the payment(s). After all the recurring charges have been migrated, recurring payments may be migrated to the second account. In some instances, the account data of the first account may be accessed using the account management interface(s) 130A, e.g., using the user's credentials. In some instances, account data may be accessed through a third party accounting service (e.g., Mint™) that the customer uses to track funds, make payments, and so forth.

In some implementations, the identification of recurring transactions (e.g., charges against and/or payments into the first account) may be based on a determination that multiple transactions share common characteristic(s), including but not limited to: a same party (e.g., payer or payee), a same amount, a same day each month when the transaction is executed, and/or other common characteristic(s). In some implementations, the identification of recurring transactions may employ fuzzy analysis. For example, the amount and/or timing (e.g., day of the month) of the transactions may be indicative of a recurring transaction even in instances where the amount and/or timing are approximately the same, e.g., within a threshold tolerance. Accordingly, transactions may be identified as recurring transactions if the amounts are within a threshold tolerance, such as a threshold percentage (e.g., within 5%) or a threshold difference (e.g., within $5.00). Transactions may also be identified as recurring transactions if the timing of the transactions is within a threshold tolerance (e.g., within three days). For example, a first transaction may have been performed on May 25 and a second transaction may have been performed on June 23, and the two transactions may be identified as recurring transactions if there is also at least some similarity in the amounts and/or the other party to the transactions.

In some implementations, a distribution of transaction amounts may be determined for a set of transactions, and a width of the distribution (e.g., standard deviation or other statistical measure) may be calculated to determine which of the transactions may be identified as recurring transactions. A similar statistical analysis may be performed based on the timing of the transactions, e.g., determining a distribution of the days of the month on which transactions occur. In some implementations, transactions may be identified as recurring if they exhibit similarities in the other party (e.g., payer or payee), the timing, and/or the amount. The identification of recurring transactions may include categorization, classification, pattern identification, natural language processing, semantic analysis, value comparison, and/or any other suitable types of processing. Supervised and/or unsupervised machine learning techniques may be employed to identify recurring transactions.

In some implementations, transactions may be analyzed to determine whether the transactions were initiated as an in-person transaction or otherwise. For example, a customer buying something in a store may result in an in-person transaction in which the customer's payment card is swiped to make the purchase, and the record of the transaction may indicate that it was an in-person transaction. Transactions that are not in-person, such as transactions initiated online through a web portal or other application, may be more likely to be recurring transactions. For example, a customer may prefer to pay a monthly or annual bill online instead of in-person at a utility office, insurance agent, or other facility. Accordingly, the classification of transactions as in-person or not in-person may be a factor that is employed to identify recurring transactions, in addition to similarities in amount, timing, and/or other party. In some implementations, transaction data may be initially filtered to remove in-person transactions, and the filtered transaction data may be analyzed to identify recurring transactions. Such filtering may reduce the chance of falsely identifying recurring transactions to be migrated to the new account. For example, a particular customer may make a purchase at a grocery store every week or every month with some regularity, but the customer may not wish to have that transaction performed automatically out of the new account going forward.

In some implementations, previous identifications of recurring transactions (e.g., for other customers) may be employed to identify recurring transactions for the customer currently being migrated. For example, previously identified recurring transactions may be analyzed to identify common parties to the transactions, such as utility companies, lenders, government agencies, and/or other services who commonly send or receive automated payments. If one of the common parties is a party to a transaction for the customer, that transaction may be flagged as a possible recurring transaction. For example, many customers in a particular city or region may send monthly payments to a particular utility company. If the account history for the customer currently being migrated includes a transaction that involves the utility company, and/or if the customer lives in the city and/or region served by the utility company, that transaction may be identified as a possible recurring transaction. Through the UI 136, the customer may be asked to confirm or deny that the transaction is to be migrated to the new account.

In some instances, if a customer lives in a city or region and a particular utility company is known (e.g., based on other customers' recurring transactions) to service that city or region, a payment to the utility company may be suggested to the customer as a possible recurring transaction even if such transactions are not present in the history of the old account. For example, the customer may send payments to the utility company from a third account that is neither the old account or the new account, and the migration process may enable the customer to request that such payments be paid from the new account instead of the third account.

In some implementations, the transaction history for the old account may include recurring transactions for which the amount varies according to a pattern. For example, a gas and/or electric bill may vary in amount over the course of the year, e.g., with higher payments in the winter and smaller payments in the summer, or vice versa. Implementations may account for such patterns of variations when identifying recurring transactions for possible migration. In some instances, the pattern may be employed to predict future amounts for the transaction and the recurring transaction may be scheduled to be paid from the new account in amount(s) that substantially follow the historical pattern. Moreover, in some instances the amount of a future transaction may be predicted based on transactions of other customers. For example, the utility bills that were paid on the first of the month for customers in an area (e.g., city, neighborhood, etc.) may be analyzed to predict the amount to be paid on the fourth of the month for a customer in the same area.

In some implementations, the identification of recurring transactions may include determining a score for each transaction. The score may indicate a likelihood that the transaction is a recurring transaction to be migrated. The score for a transaction may be based on any or all of the factors described above, including: whether the transaction exhibits a same (or approximately same) amount as other transactions; whether the transaction exhibits a same (or approximately same) timing as other transactions; whether the transaction exhibits a same (or similar) other party as other transactions; whether the transaction is in-person or not in-person; and/or whether the other party to the transaction has been previously identified as a common party involved in recurring transactions for other customers. In some implementations, a transaction may be determined to be recurring if its score exceeds a threshold score.

Charge(s) may be migrated (112) from the first account to the second account. In some examples, the time it takes to migrate a charge may be dependent on personnel or processes operating at the recipient institution of each charge, such as a bank, lender, or any other party receiving transfers from the first account. Accordingly, implementations may monitor each charge to be migrated, and detect when the charge is migrated such that it is made against the second account instead of the first account. If it is determined (114) that additional charge(s) remain to be migrated, the process may continue monitoring the second account for charge migration. In some implementations, the operations at 110 and/or 112 may be performed after 104, and before 106 and/or 108. Implementations also support the performance of the operations of 106, 108, and 110 in any order.

Implementations support the use of various mechanisms for migrating charges from the first account to the second account. For those charges that were previously made via ACH transfer or some other type of (e.g., push) transfer from the first account to the recipient, those charges may be disabled from the first account and scheduled to be made from the second account in the future. For those charges that were previously made via an automated withdrawal from the first account (e.g., pull) by the recipient, the recipient may be contacted to specify the second account as the new source of payments going forward. In some examples, a recipient such as a utility company, lender, or other entity may expose an API that enables a process (e.g., migration module(s) 134) to send a communication specifying different bill payment or other funds transfer options after providing the customers credentials (e.g., login, password, etc.). In such examples, the API may be accessed with the appropriate credentials to switch payment options to specify the second account instead of the first account. In some examples, the recipient may provide a web site or other application to enable a customer to access their customer information and specify payment options. In such examples, the web site may be automatically accessed using the customer's credentials to change the payment options and specify the second account. In some examples, a physical letter, electronic message, or other communication may be automatically generated and sent to the recipient on behalf of the customer, instructing the recipient to use the second account for future charges.

In some implementations, charges may be scheduled to ensure stability of funds in the second account and/or reliability of payments. In some instances, charges may be scheduled to be paid out of the second account according to an optimized schedule. For example, charges may be spread throughout the month to avoid situations where a large number of charges and/or a large total charge amount is paid out of the account on a particular day or during a particular week. In some instances, charges may be scheduled to be performed after a recurring payment (e.g., paycheck deposit) is made into the new account, to reduce the risk of overcharges against the new account. In some implementations, recurring charges may be scheduled to be made from the second account in an amount that is somewhat larger than is needed to cover the charge, to mitigate or eliminate the possibility of underpaying the charge.

As charges are made against the second account (e.g., as the charges complete migration), funds may be moved from the first account to the second account to cover the charges. For example, if a migrated charge for $20 is made against the second account during the migration process, the service may check that the first account currently holds $20. If so, the charge may be paid from the second account and, before or after the payment, $20 may be transferred from the first account to the second account to cover the charge. Alternatively, charges against the second account may be tracked and summed, and periodic transfers may be made from the first account to the second account to cover the accumulated charges that have been paid out of the second account. In this way, implementations may support a validation of funds availability and/or a pull of funds from the first account to the second account, such that the validation and/or pull is performed in real time with respect to the charge being made against the second account.

The process is described further with reference to FIG. 1C. Payment(s) may be migrated (116) from the first account to the second account. In some examples, the time it takes to migrate a payment may be dependent on personnel or processes working at the payer of each payment, such as a payroll processing service or any other party sending payments to be deposited into the first account. Accordingly, implementations may monitor each payment to be migrated, and detect when the payment is migrated such that it is made to the second account instead of the first account. If it is determined (118) that additional payment(s) remain to be migrated, the process may continue monitoring the second account for payment migration.

Implementations support the use of various mechanisms for migrating payments (e.g., automated deposits or credits) from the first account to the second account. In some examples the payer may expose an API, web site, application, or other interface as described above. In such examples, the interface may be accessed using the customer's credentials and the migration module(s) 134 may send a communication to the API instructing the payer to make future payments into the second account instead of the first account. In some examples, a physical letter, electronic message, or other type of communication may be automatically generated and sent to the payer on behalf of the customer, instructing the payer to make future payments into the second account instead of the first account. In some examples, the customer may be provided with detailed instructions describing how to request that a payer make future payments into the second account instead of the first account, and the customer may follow such instructions to initiate the migration of a particular payment. In some instances, the service may contact the payer (e.g., telephonically) and request the change of account on behalf of the customer (e.g., with the customer's permission to do so). The service may also host or otherwise facilitate a phone call, chat session, or other type of communication between the customer and the payer to aid the customer in requesting that the payer make future payments into the new account.

In some implementations, after all the identified charges and payments have been migrated to the second account, the remaining funds (e.g., remaining balance) may be transferred (120) from the first account to the second account. Implementations may discontinue (122) processing charges against the second account as begun per block 108.

A notification may be sent (124) to the customer indicating that the first account is ready to be closed. The notification may recommend that the first account be closed. Funds transfers described herein may be performed as Automated Clearing House (ACH) transfers or transfers that employ other mechanisms. During the migration of charges, payments, and funds from the first account to the second account, the customer may be presented with a current status of the migration process through the UI 136 of the application. For example, the customer may view the current balances of one or both of the first account and the second account, a combined balance of both accounts, pending charges from the first and/or second account, pending payments to the first and/or second account, or other information. In some instances, the UI 136 may indicate an amount of progress (e.g., percentage complete) that has been made in the migration process.

In some implementations, account information for the first account may be analyzed to identify periodic, regular, and/or semi-regular, charges paid from the first account and/or payments made to the first account. Implementations may analyze the account history to identify auto-draft payments to pay bills or otherwise transfer funds, by searching for payments that exhibit one or more of the following characteristics: a regular periodicity, e.g., every 30 days, on the first of every month, etc.; a regular amount, within a predetermined variance, e.g., $50.00 on the 15th of each month, plus or minus 10%; or a common party, e.g., a regular payment to, or credit from, an entity with the same name every month, such as a utility company or lender for a regular charge, or such as an employer for a regular deposit (e.g., payroll). Each of these characteristics may exhibit a variance that is taken into account by implementations when identifying charges or payments. For example, a customer may manually pay a utility bill every month, such that the timing of the outgoing payment from the first account varies within a range of several days from month to month.

In some implementations, regular or semi-regular charges or payments may be identified based on inferences made using other information regarding the customer. For example, if the customer has a home address in San Antonio, implementations may infer that the customer makes a regular (e.g., monthly) payment to one or more utility companies that provide services in the San Antonio area. In some implementations, the UI 136 may present to the customer a list of charges and/or payments that have been identified as recurring charges for possible migration. The customer may use the UI 136 to edit or remove transactions that have been incorrectly identified or which the customer does not wish to have migrated. The UI 136 may also enable the customer to manually specify additional charges or payments made from or to the first account. The analysis of the first account information may analyze any time period of account history to identify regular or semi-regular transactions. For example, 18 months of account history may be analyzed to ensure that implementations identify yearly payments as well as payments made more frequently (e.g., weekly, monthly, bi-monthly, etc.).

In some implementations, the UI 136 may present to the customer a combined balance of both the first and second accounts, to let the customer know how much money they have available generally. In some implementations, the customer may not be informed when particular charges or payments are transferred from the first account to the second account. From the customer's standpoint, any bills or other charges are paid automatically either directly from the second account funds or from the second account in association with a transfer of funds from the first to second account. Accordingly, implementations provide for an account migration process that does not require the supervision or further instructions of the customer during the migration, creating a more hassle-free and positive user experience for the customer. Implementations may provide the customer with confidence that the migration will take place without the occurrence of overdrafts, misplaced funds, missed bill payments, or other problems.

In some implementations, the physical and/or virtual credit card and/or debit card may be generated and issued to the customer following the migration of charges, payments, and remaining funds from the first account to the second account, instead of issuing the card prior to migration of charges, payments, and remaining funds as described above. In some implementations, the entity managing the migration may be the financial institution of the second account. In such examples, the financial institution may take responsibility for paying late fees for bills paid late during the migration, or overcharge/insufficient funds fees for overcharges against the first and/or second accounts during the migration.

In some implementations, a safe window may be provided to ensure that sufficient funds are available to handle charges paid during the migration process. In some instances, a charge such as a bill payment is expected on a particular day, and there may be a possibility that the charge will be made against the old account (e.g., if the third party biller has not yet switched to use the new account). In such instances, the transfer of the remaining funds to the new account may be delayed to account for the possibility that the charge is made against the old account. Moreover, in some instances the migration of the charge may be delayed until the next billing cycle to ensure availability of sufficient funds in the new account. The length of this safe window may be based on how long it has taken in the past for particular billers to switch to using a new account. For example, the length of the safe window may be five to seven days.

In some implementations, the migration of charge(s) and/or payment(s) may be performed based on the customer's consent. For example, the service may analyze the first account history to identify recurring charge(s) and/or payment(s), and a list of such transactions may be presented to the customer (e.g., user 140) through the UI 136. The customer may then select which transactions are to be migrated to the second account, and which are to remain to be paid to or from the first account. In some implementations, the migration of charge(s) and/or payment(s) may be performed automatically, e.g., in response to the customer initially indicating that they consent to the automatic migration of at least some of the identified recurring transactions.

In instances where the customer is required to maintain a minimum balance in the first account, the transfer of the remaining funds from the first account to the second account may be delayed until the customer is ready to close the first account. In some implementations, the transfers from the first account to the second account may be combined and/or scheduled in such a way as to minimize any transfer fees that may be charged by the old and/or new financial institution.

FIGS. 2A-2E depict an example UI 136 presenting a tutorial describing account migration, according to implementations of the present disclosure. FIGS. 2A-2E may be presented through the UI 136, to inform the customer how the migration process may proceed. Accordingly, the customer may view an example of a switch timeline (FIG. 2A) during which the migration will take place. The switch timeline may be broken into pay periods according to the payroll payments identified from the account history of the first account. The switch timeline may include a line or other UI element indicating, over time, an account balance as shown in FIG. 2C. The switch timeline may also indicate, using dots or other UI elements, bills that are scheduled to be paid out of the first or second accounts as shown in FIG. 2B The tutorial may also describe other features of the UI 136 for monitoring account migration, such as the capability of presenting additional information regarding bill(s) or other debits, as shown in FIG. 2D, and the capability of presenting a balance amount in the first and/or second account, or a combined balanced amount, as shown in FIG. 2E.

Figure 3A:
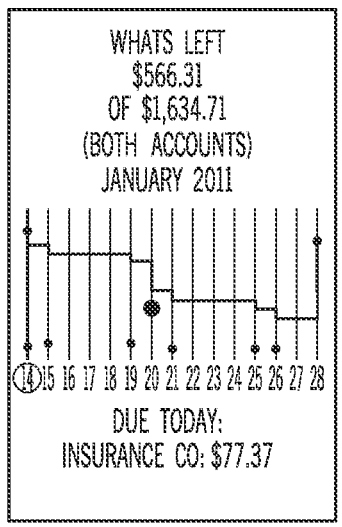
FIGS. 3A-3F depict an example user interface for account migration, according to implementations of the present disclosure.
Figure 3B:
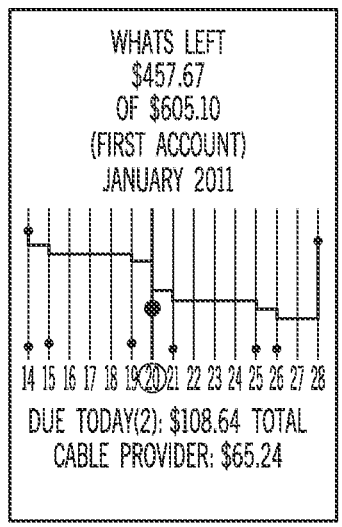
Figure 3C:
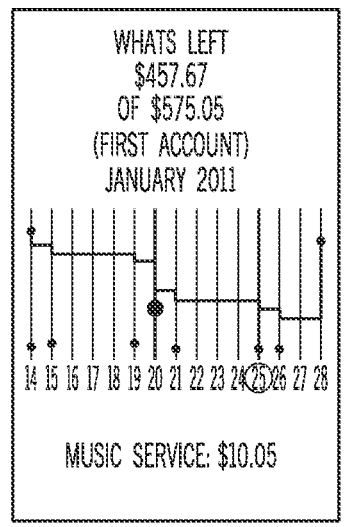
Figure 3D:
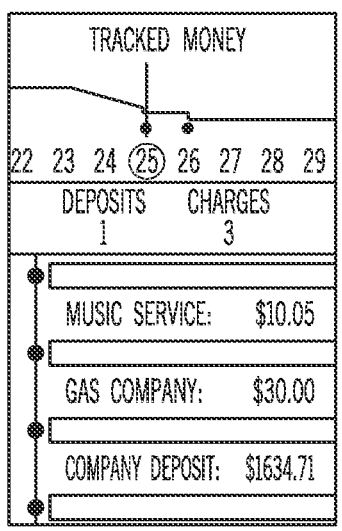
Figure 3E:
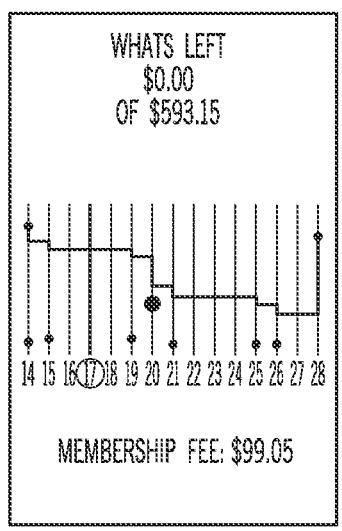
Figure 3F:
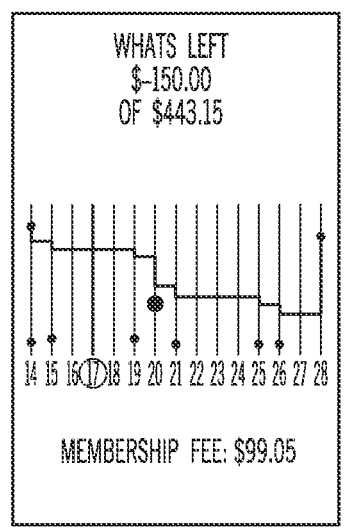

FIGS. 3A-3F depict an example UI 136 for account migration, according to implementations of the present disclosure. At various selectable points along the migration timeline, the customer may select a date and, in response, the UI 136 may present the amount that remains (e.g., "what's left") in the first account. For example, as shown in FIG. 3A, the first account may have $S66.31 out of the total funds $1,634.71 in both accounts. If the customer selects a day on which a charge is scheduled, as shown in FIG. 3D, the UI 136 may present a summary of the various bills or other charges to be paid on that day out of the first account (e.g., if the charge(s) have not completed migration) or out of the second account (e.g., if the charge(s) have completed migration). As shown in FIGS. 3E and 3F, the UI 136 may indicate a zero balance or negative balance in the first account.

FIGS. 4A-4C depict an example UI 136 for account migration, according to implementations of the present disclosure. In some implementations, the UI 136 may present a graph over time of the balances in both the first and second accounts. As shown in the example of FIG. 4A, the balances of the different accounts may be indicated as different colors or may otherwise be visually distinguishable. The UI 136 may present a status of the migration including the number of bills still to be paid from the first account and a number of bills to be paid from the second account, as shown in FIG. 4A. The UI 136 may also present a view that indicates a number of upcoming bills and/or a number of paid bills paid from the first account and/or the second account. As shown in the example of FIG. 4B, the customer may select whether to view the number of upcoming and/or paid bills to be paid from the old account or the new account. The UI 136 may also present a summary of the first and second (e.g., connected) accounts, as shown in FIG. 4C. The summary may include the balances in each of the accounts, the total balance, the identified charges and/or payments, or other information.

Figure 5D:
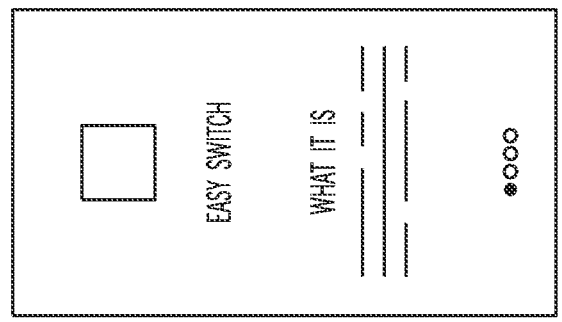
FIGS. 5A-5F depict an example user interface for account migration, according to implementations of the present disclosure.
Figure 5C:
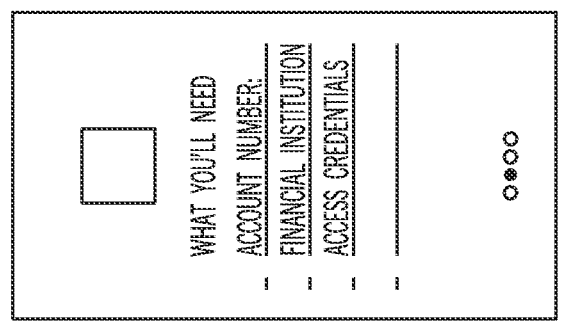
Figure 5B:
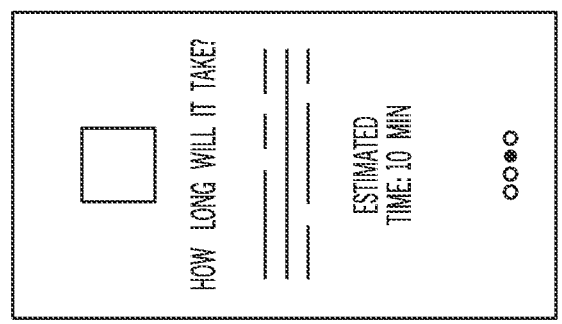
Figure 5A:
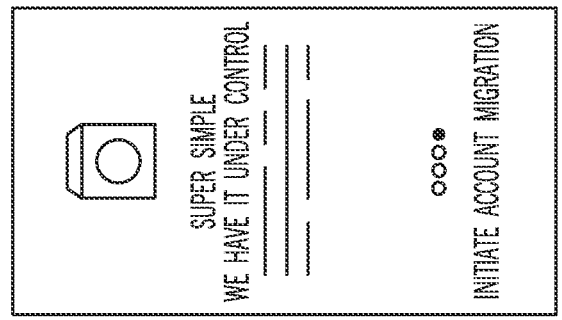
Figure 5F:
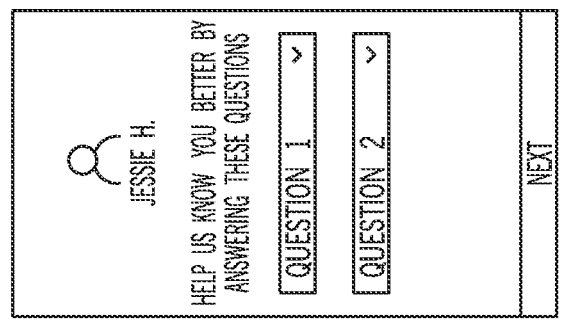
Figure 5E:
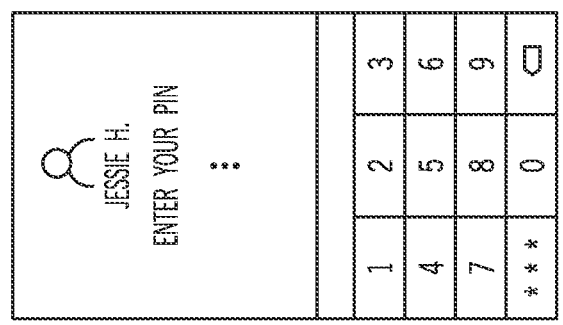

FIGS. 5A-5F depict an example UI 136 for account migration, according to implementations of the present disclosure. As shown in the examples of FIGS. 5A-5F, the UI 136 may provide a description of the migration service (e.g., FIG. 5A) to the customer. The UI 136 may indicate the information that the customer will need to provide (e.g., FIG. 5B), such as the account number, financial institution, and/or access credentials for the first account. The UI 136 may indicate the estimated amount of time it will take to complete the migration (e.g., FIG. 5C). The UI 136 may include a control to let the customer request that the account migration be initiated (e.g., FIG. 5D). As shown in FIG. 5E, the UI 136 may collect security credentials from the customer such as a PIN, username, password, and so forth, for the first account and/or second account. The UI 136 may also collect other information regarding the customer, as shown in FIG. 5F.

Figure 6A:
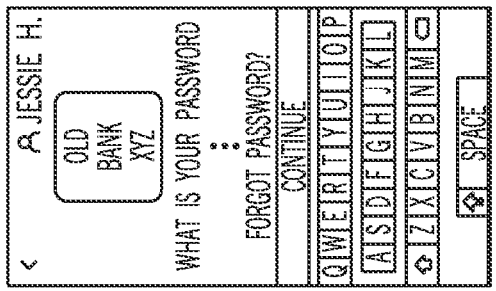
FIGS. 6A-6F depict an example user interface for account migration, according to implementations of the present disclosure.
Figure 6B:
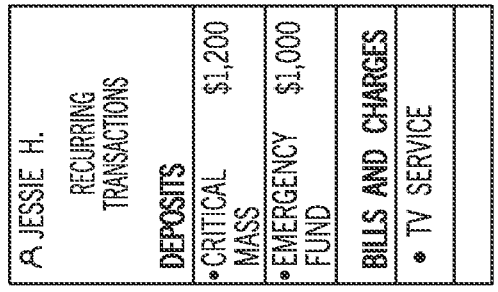
Figure 6C:
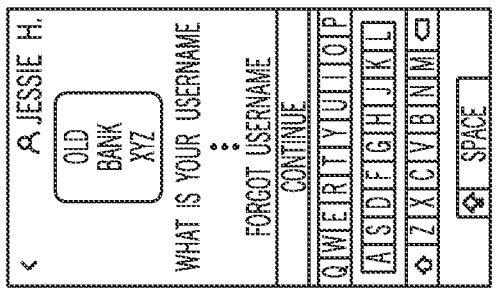
Figure 6D:
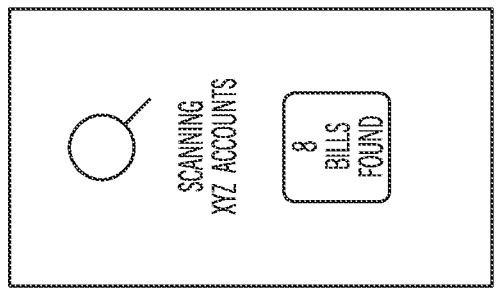
Figure 6E:
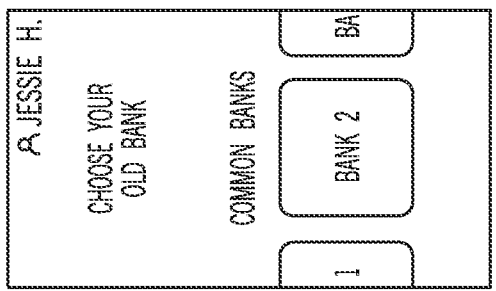
Figure 6F:
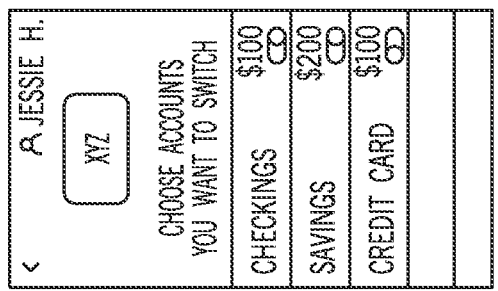

FIGS. 6A-6F depict an example UI 136 for account migration, according to implementations of the present disclosure. The UI 136 may present controls or other UI elements to enable the customer to indicate the financial institution of the first account, as shown in FIG. 6A. The UI 136 may also present controls or other UI elements to enable the customer to provide access credentials for the financial institution of the first account, such as username, password, and so forth as shown in FIGS. 6B and 6C. Implementations may communicate with the financial institution of the first account, and establish a connection using the credentials. Implementations may retrieve account information for the customer from the financial institution, and present a list of first account(s) associated with the customer as shown in FIG. 6D. The customer may select which of the first account(s) to be migrated. Implementations may retrieve the account history for the first account(s) and scan the history to identify regular, or semi-regular, charge(s) and or payment(s) as shown in FIG. 6E. The charge(s) and/or payment(s) identified may be presented in the UI 136, as shown in FIG. 6F.

Figure 7D:
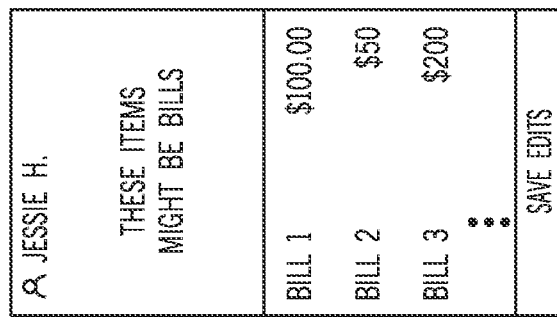
FIGS. 7A-7D depict an example user interface for account migration, according to implementations of the present disclosure.
Figure 7C:
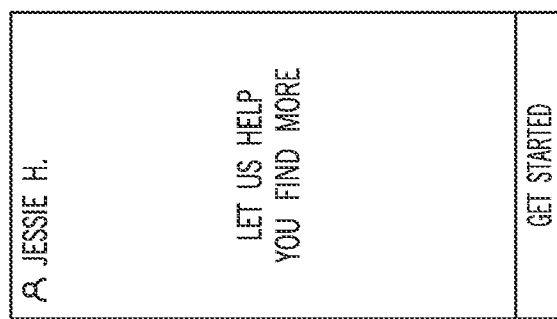
Figure 7B:
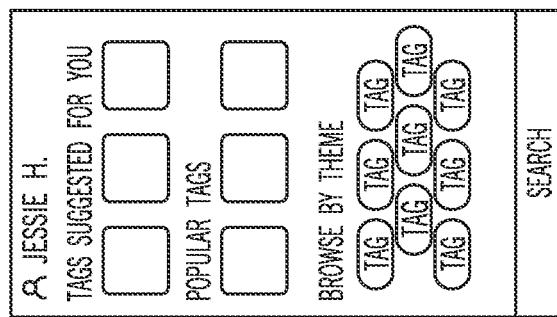
Figure 7A:

FIGS. 7A-7D depict an example UI 136 for account migration, according to implementations of the present disclosure. The UI 136 may present details for a selected charge or payment, and enable the customer to edit the details or provide further information regarding the selected transaction, as shown in FIG. 7A The UI 136 may also help the customer identify additional regular or semi-regular charge(s) and/or payment(s) by suggesting possible charge(s) and/or payment(s) (e.g., popular, common, or based on location). The UI 136 may also enable the customer to request a search of the account history for particular transaction(s) that correspond to user-specified tags or other search criteria, as shown in FIGS. 7B and 7C. The UI 136 may also enable the customer to turn on, or turn off, smart notifications, to receive updates regarding the migration process, as shown in FIG. 7D.

Figure 8A:
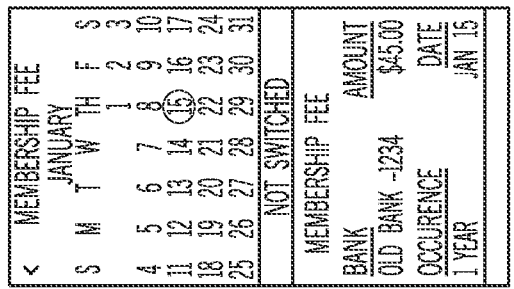
FIGS. 8A-8E depict an example user interface for account migration, according to implementations of the present disclosure.
Figure 8B:
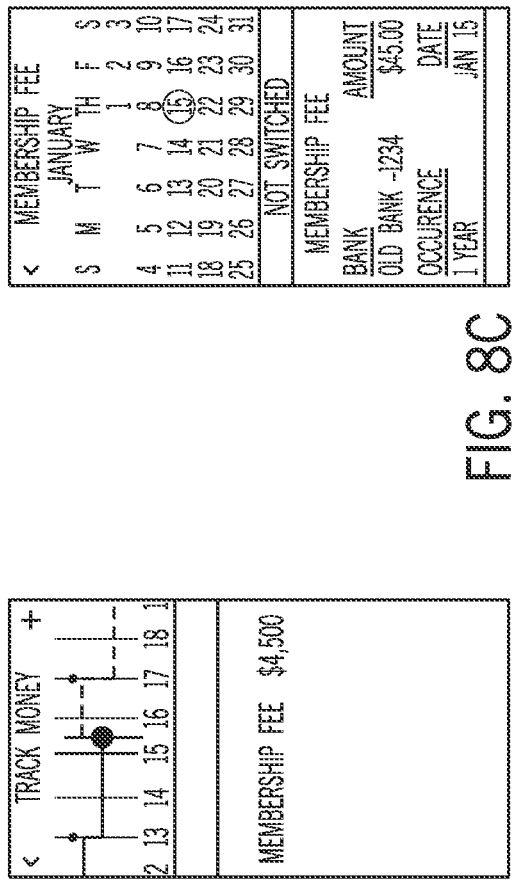
Figure 8C:
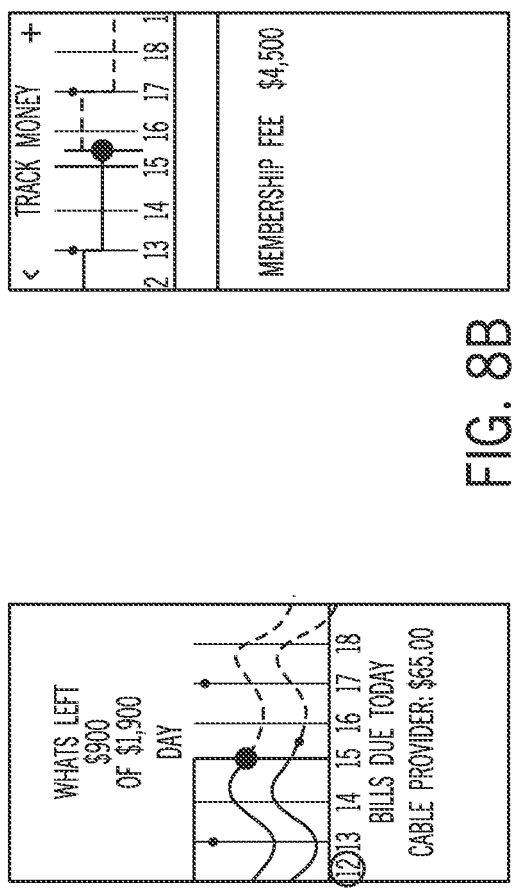
Figure 8D:
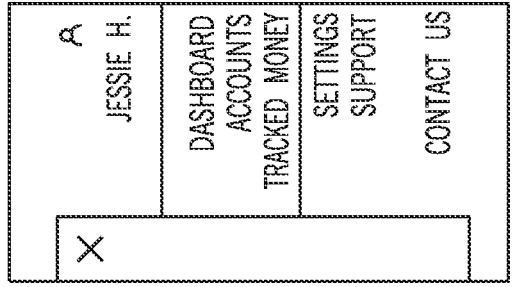
Figure 8E:
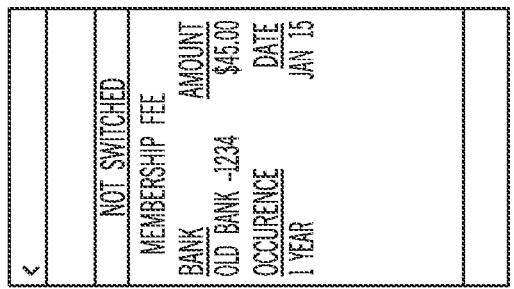

FIGS. 8A-8E depict an example UI 136 for account migration, according to implementations of the present disclosure. As shown in FIG. 8A, the UI 136 may present information regarding the balance in the first account (e.g., "what's left") and the total balance (e.g., "of $1900.00") over time for the past, and estimated for the future based on expected payment(s) and/or charge(s) to be made. The UI 136 may also indicate charge(s) (e.g., bill(s)) that are due today or on a selected date. As shown in FIG. 8B, the UI 136 may enable the customer to select other dates and view the charge(s) and/or payment(s) for that date. The UI 136 may present a linear graph of dates as shown in FIG. 8B, or a calendar view as shown in FIG. 8C. The UI 136 may enable the customer to select a charge or payment for editing, and show the status of the charge or payment (e.g., migrated or not migrated), as shown in FIGS. 8C and 8D. As shown in FIG. 8E, the UI 136 may also provide a top level screen that enables the customer to navigate to various sections of the application, such as a dashboard, accounts summary, tracked money (e.g., funds in the various accounts), settings, support, or to contact a customer service representative.

Figure 9D:
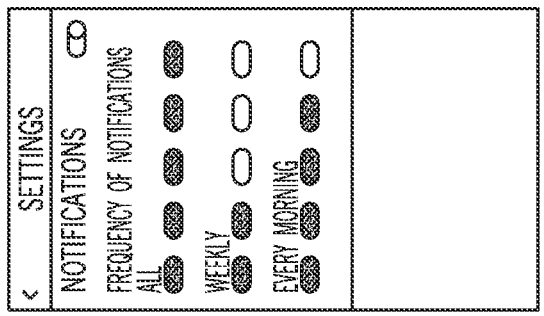
FIGS. 9A-9D depict an example user interface for account migration, according to implementations of the present disclosure.
Figure 9C:
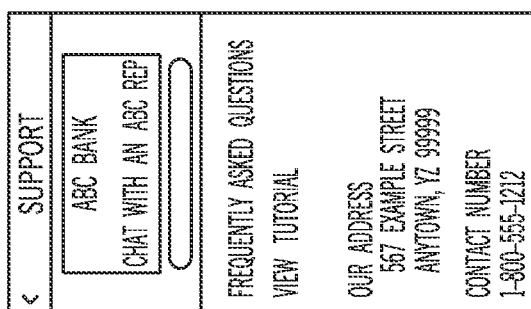
Figure 9B:
Figure 9A:
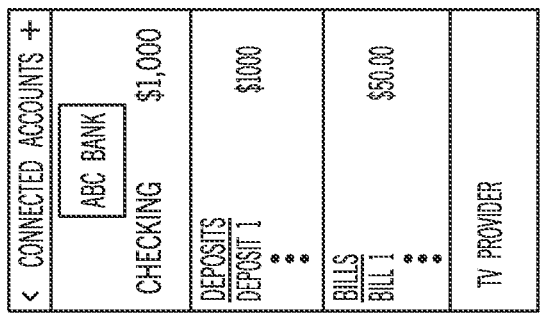

FIGS. 9A-9D depict an example UI 136 for account migration, according to implementations of the present disclosure. As shown in FIG. 9A, the UI 136 may enable the customer to select an account and view the various payments (e.g., deposits) and/or charge(s) (e.g., bills) that have been identified as being paid out of the account or received into the account. The UI 136 may enable the customer to provide feedback regarding the migration service, as shown in FIG. 9B. The UI 136 may also enable the customer to access support information such as frequently asked questions or a tutorial, or contact a customer service representative, as shown in FIG. 9C. The UI 136 may enable the customer to change their personal settings, such as the type and frequency of notifications to be sent to the customer, as shown in FIG. 9D.

Figure 10:
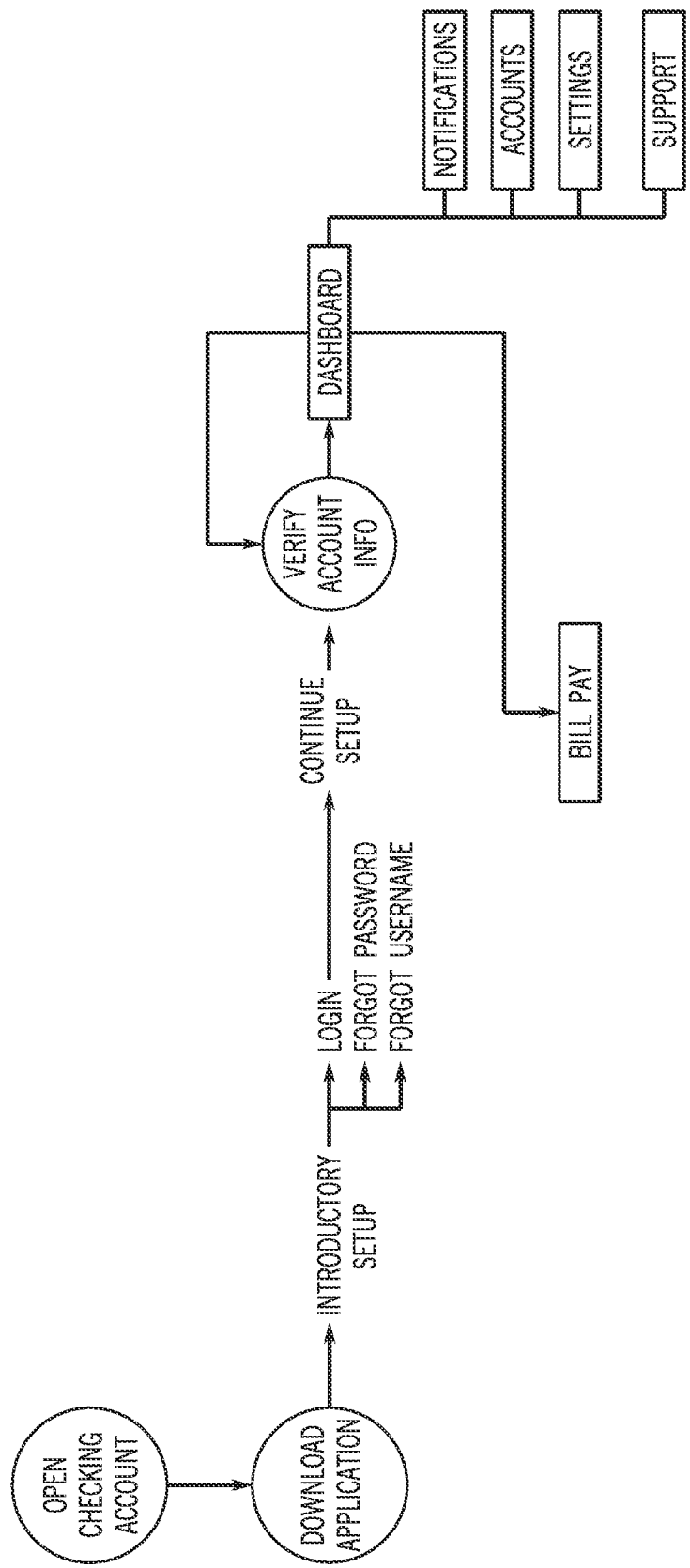
FIG. 10 depicts an example system architecture, according to implementations of the present disclosure.

FIG. 10 depicts an example system architecture, according to implementations of the present disclosure. FIG. 10 depicts an example architecture and control flow for onboarding a new customer at the financial institution of the second account, e.g., the customer's new bank. As shown in FIG. 10, a new account (e.g., checking account) may be opened for the customer, and the customer may download the application to their smartphone, tablet, or other computing device. The customer may login to the application using credentials such as a username, password, PIN, or other credentials. The customer may be presented with introductory information, and the customer may be guided through the process to setup the account migration. The customer may be prompted to provide account information for the first account to be migrated, and verify the account information. The customer may then be shown the dashboard for managing account migration.

Figure 11:
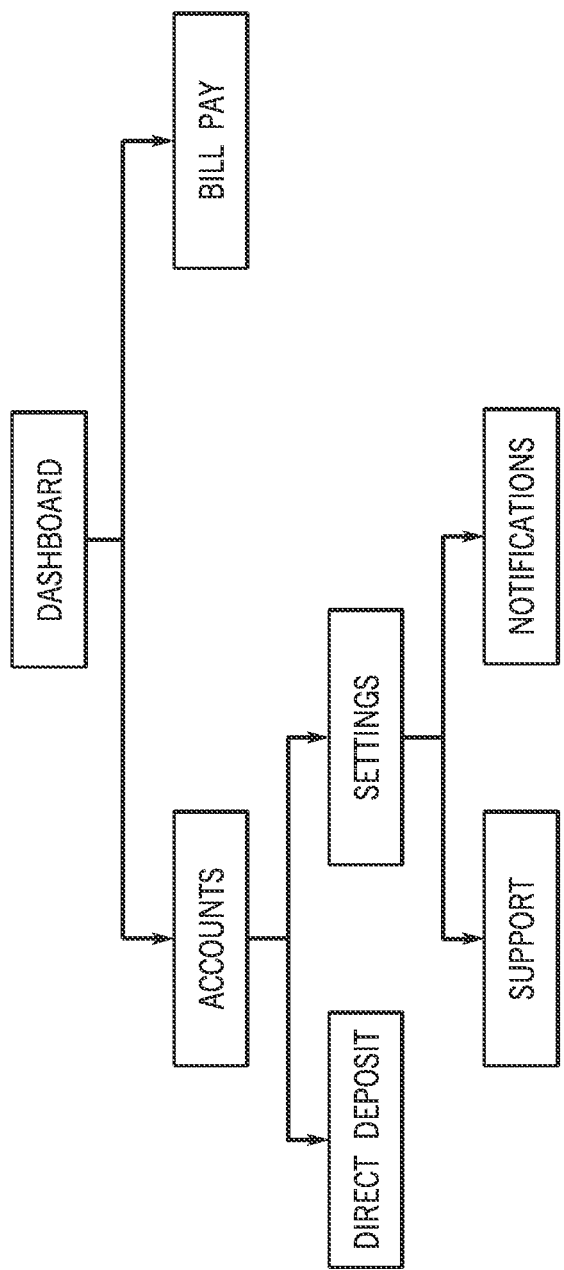
FIG. 11 depicts an example system architecture, according to implementations of the present disclosure.

FIG. 11 depicts an example system architecture, according to implementations of the present disclosure. FIG. 11 depicts an example architecture for the dashboard for account migration, which may be presented within the UI 136 of the application. The dashboard may include sections to enable the customer to view accounts or bill pay information. The accounts information may include sections for direct deposit and settings, and the settings information may include sections to enable the customer to request support to provide preferences for notifications to be sent to the customer during the migration process.

As described above, the migration process may include the migration of charge(s) (e.g., regular charges) from a first account to a second account, to cause the charge(s) to be automatically paid through scheduled payments from the second account instead of from the first account. Such charge(s) may include bills such as utility bills, rent payments, mortgage payments, credit card payments, subscriptions to services, and so forth. In some implementations, an image of a bill may be analyzed to extract bill information which is then used to migrate a bill or other type of charge to be paid from a (e.g., new) second account of the user 140. For example, the user 140 may use a camera in a smartphone, or some other image capture device, to capture one or more images of a bill, such as a paper bill that may be mailed to the user 140 from a biller. In some implementations, the user 140 may identify and upload an image of a bill that is already in a digital format, such as a Portable Document Format (PDF) file of the bill provided by the biller to the user 140. Implementations may support the use of other image file formats for the image(s) of the bill, including any suitable version of JPEG, GIF, BMP, PNG, and so forth.

The image(s) may be uploaded to the migration module(s) 134 or some other process, which analyzes the image(s) to extract bill information. In some implementations, optical character recognition (OCR), intelligent character recognition (ICR), and/or any other suitable pattern recognition algorithm may be employed to extract the bill information from the image(s) of the bill. In some implementations, the bill may include a scannable code in the form of a one-dimensional barcode, a two-dimensional matrix barcode such as a quick response (QR) code, or some other format of scannable code. In such instances, analyzing the image(s) may include scanning the code to decode the bill information that is encoded into the scannable code.

The bill information extracted from the image(s) may include, but is not limited to, one or more of the following: the name, address, and/or other identifying information the user 140; the name, address, and/or other identifying information for the biller; an account number of the user 140 with the biller; an address to which payment is to be sent; an amount of the bill (e.g., a monetary value), which may include a total balance on the user's account with the biller, a minimum payment due, or some other amount; and/or a due date for the bill.

In some examples, an image of the bill may be analyzed to determine bill information that is not available and/or is not able to be determined from the account history of the user's old account. For example, the account history may not include a full account number for the user's account with the biller, an address of the biller, and/or other information needed to schedule payment of the bill. In such instances, the bill information extracted from the image(s) of the bill may supplement the information determined through analysis of the account history. In some examples, the image(s) of the bill may be analyzed to determine bill information that may not otherwise be available in the account history, such as bill information for bills that may not have been paid from the old account or for some other reason did not appear in the account history of the old account.

Figure 12:
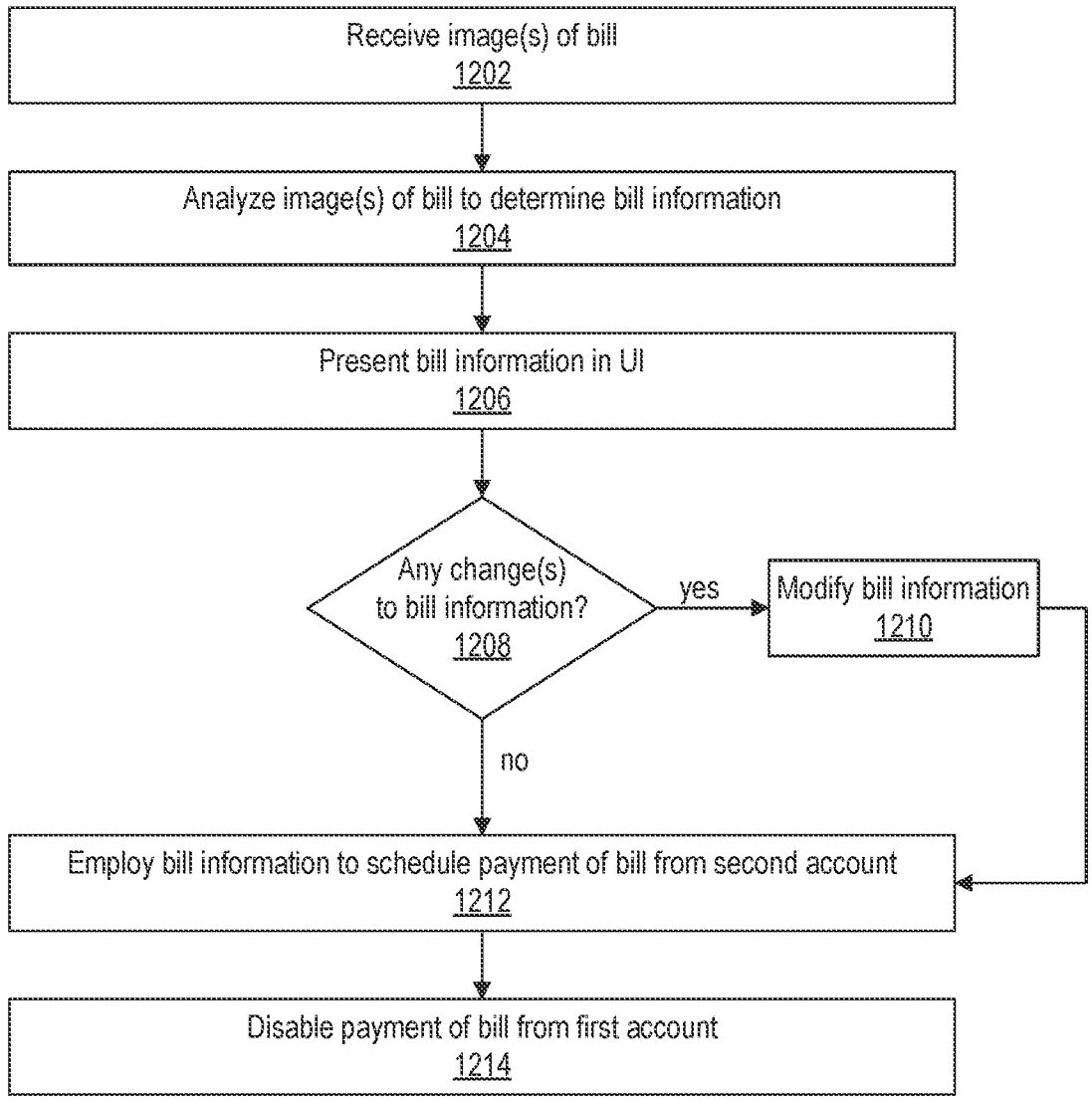
FIG. 12 depicts a flow diagram of an example process for extracting image data to use in account migration, according to implementations of the present disclosure.

FIG. 12 depicts a flow diagram of an example process for extracting image data to use in account migration, according to implementations of the present disclosure. Operations of the process may be performed by the migration module(s) 134, the UI 136, and/or other software module(s) executing on the user device 138, the account migration device(s) 132, or other computing device(s).

One or more images of a bill, or other type of physical (e.g., printed, paper) document, may be received (1202). As described above, the image(s) may be taken by an image capture device (e.g., camera) that is incorporated in the user device 138 or that is separate from the user device 138. In some instances, the image(s) may have been provided to the user 140, as an electronic bill, from the biller. The image(s) may be in any suitable image format. The document may have been sent to a payor from a payee (e.g., the biller), indicating that the payor owes the payee a certain amount. The payor may be the user 140, or some other individual.

The image(s) may be analyzed (1204) to extract the bill information from the image(s). As described above, analysis may include pattern recognition such as OCR, ICR, or some other suitable technique. Analysis may also include decoding a scannable barcode of one or more dimensions that is included on (e.g., printed onto) the bill, such as a QR code. In some implementations, the analysis of the image(s) may include comparing the image(s) to a model (e.g., template or format) that has been previously determined for the payee. The model may indicate, for each of at least one location in the physical document, a respective information element to be extracted from the respective location in the at least one image. For example, the model may indicate an expected location, on a bill, for the amount due, due date, payor account number, and/or other information.

In some implementations, the bill information may be presented (1206) in a UI to the user 140. The user 140 may review the extracted bill information and, in some instances, edit the presented bill information to provide missing information or correct erroneously extracted information. A determination may be made (1208) whether the user 140 has made any changes to the bill information through the UI. If so, the bill information may be modified (1210). Any number of edits may be made to the bill information until the user 140 is satisfied that the information is correct and complete. The bill information can include an identifier of the payee (e.g., the biller), such as the name of the payee, the address of the payee, and so forth. The bill information can also include information identifying the payor, such as the payor's name, address, account number (for the payor's account with the payee), and so forth. The bill information can also include other information, including but not limited to an amount due and a due date.

The bill information (as extracted and/or edited) may be employed (1212) to schedule a transaction, such as the payment of the bill through a transfer of funds from an account of the payor to an account of the payee. In some instances, the payment may be from the second (e.g., new) account, as described above. In some instances, the payment of the bill from the first (e.g., old) account may be disabled (1214) as described above. In some instances, disabling a bill may include interacting with the user's old account to disable the previously set up bill pay option for the bill. In some instances, disabling a bill may include contacting the biller to instruct the biller to stop making the regular scheduled charge against the old account. Disabling a bill may also include contacting a third party bill pay service and requesting that the bill no longer be paid from the old account. The payment of the bill may be scheduled to be performed at some later date and/or time, or the payment of the bill may be initiated shortly following the determination of the bill information (e.g., immediately).

In some implementations, a model of the bills sent from a particular biller (e.g., a particular utility company) may be developed and stored for use in extracting bill information from bills of that particular biller. The model may describe the location(s) of various portions of information on the bill, such as the location(s) of the amount due, the bill due date, the name and address of the biller, the user's account number with the biller, and so forth. Such location information may facilitate the extraction of bill information from a bill by indicating, to the extracting process, where particular portions of bill information are likely to be located on a bill. The model may include, for each portion of bill information, the coordinates or a range of coordinates for one or more portions of the bill information. Coordinates may be expressed as distances along X- and Y-axes, such as a number of pixels from an edge of the bill, or a percentage of the length or width of the bill.

In some instances, if a bill due date is determined to be imminent, and if the bill includes a quick pay option in the form of a telephone number or web site, the quick pay information may be extracted from the image(s) of the bill and presented in the UI to enable the bill to be paid without becoming overdue. In some implementations, the quick pay option (if present) may be automatically performed by the system to ensure that the bill is paid on time.

FIGS. 13A-13F depict example UIs for account migration using extracted image data, according to implementations of the present disclosure. In some examples, the UIs may be the UI 136 described above, such as a web UI served from a web server executing on the account migration device(s) 132 or elsewhere. In such instances, the UIs may be presented within a web browser or other web content container executing on the user device 138. In some instances, the UIs may be provided by an application (e.g., an app) executing on the user device 138.

Figure 13A:
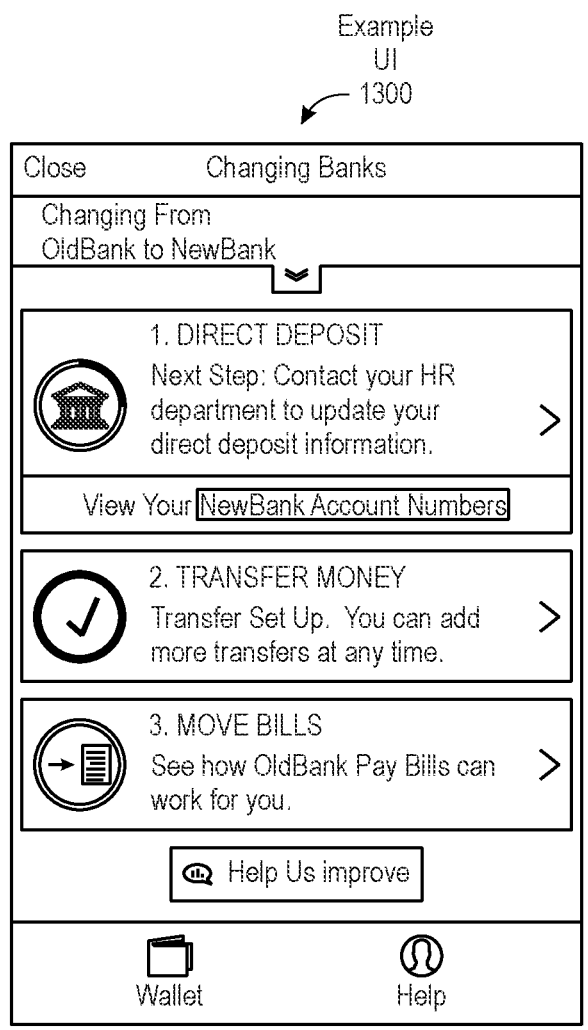
FIGS. 13A-13F depict example user interfaces for account migration using extracted image data, according to implementations of the present disclosure.

In the examples of FIGS. 13A-13F, the user 140 has requested account migration from an old account with OldBank to a new account with NewBank. FIG. 13A shows an example UI 1300 showing sections of a user experience (e.g., web site, app, etc.) for managing and/or monitoring the account migration, such as sections for migration of direct deposit, transferring money from the old account to the new account, or moving (migrating) bills from the old account to the new account.

Figure 13B:
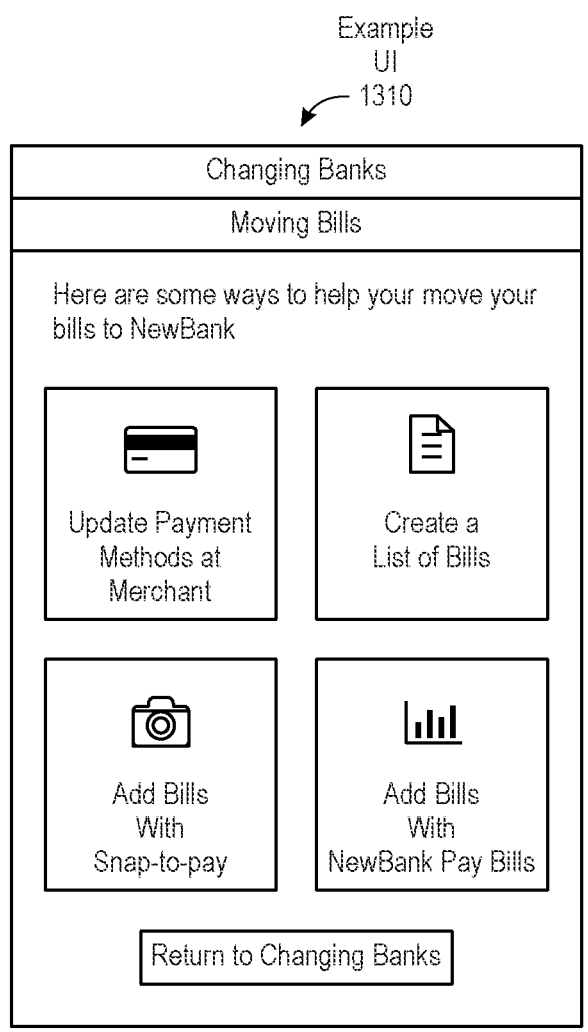

If the user 140 navigates to the moving bills section, the UI may present information as shown in FIG. 13B. In the example UI 1310 of FIG. 13B, the user 140 may select options to update payment method at a merchant, create a list of bills, add bills with a Snap-to-Pay (e.g., the image analysis process described above), or add bills with a different NewBank Pay Bills feature.

Figure 13C:
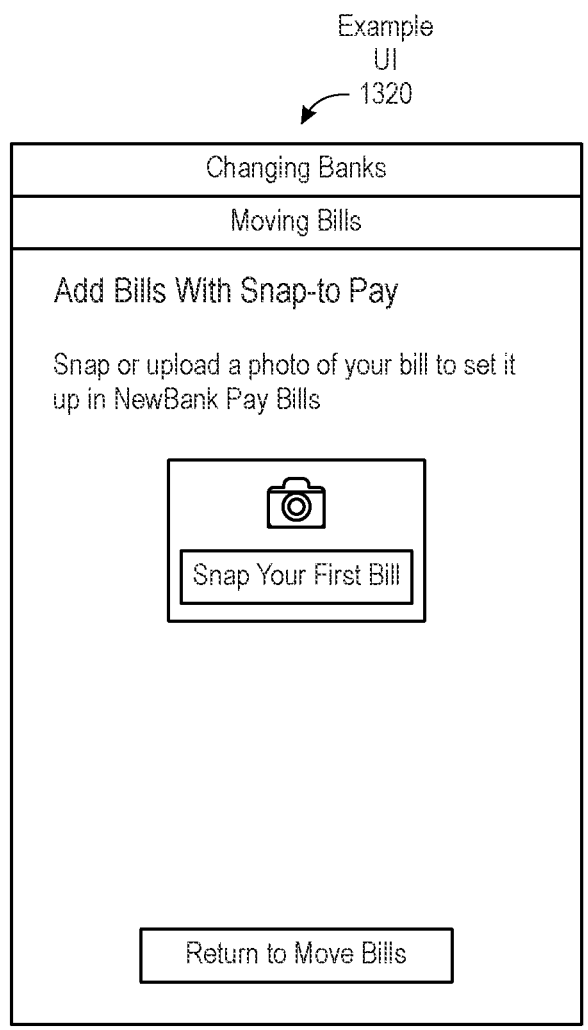

If the user 140 selects the Snap-to-Pay option, the UI may present information as shown in FIG. 13C. In the example UI 1320 of FIG. 13C, the user 140 may select a UI element to "Snap Your First Bill."

Figure 13D:
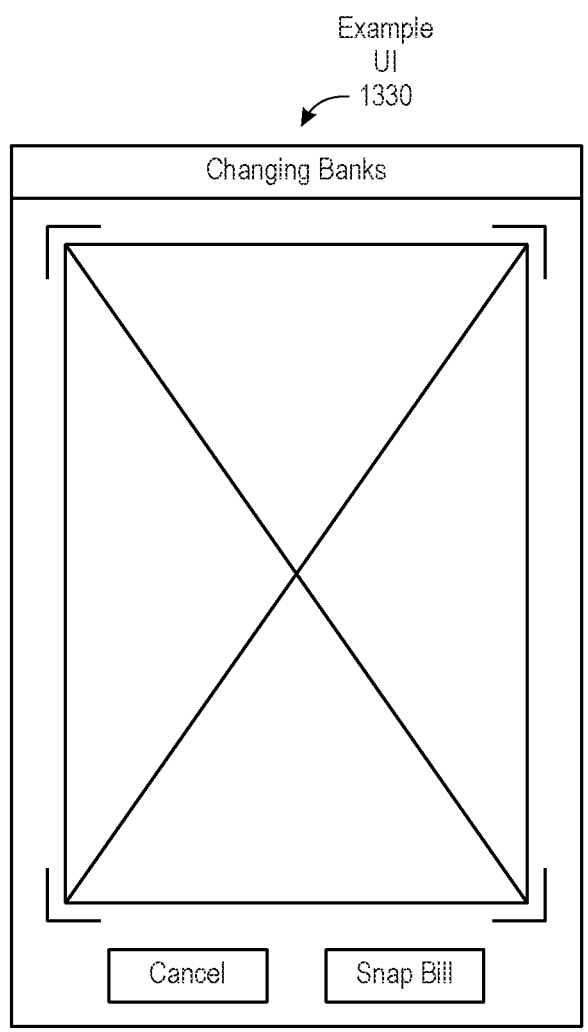

Based on the selection, the UI may present an image capture UI element, as shown in example UI 1330 of FIG. 13D. The user 140 may move the image capture device (e.g., their user device) to locate the bill in the rectangular frame indicated in the image capture UI element. The user 140 may then tap the UI (e.g., click on "Snap Bill") or otherwise gesture to instruct the image capture device to capture the image of the bill in the frame.

Figure 13E:

The captured image(s) may be analyzed, as described above, to extract the bill information from the image(s). The UI may present the bill information an example UI 1340, as shown in FIG. 13E. The UI may provide an "Edit" feature to enable the user 140 to edit the extracted bill information, to correct erroneous information and/or provide missing information. Once the user 140 is satisfied that the bill information for this biller is correct and complete, the user 140 may click (or otherwise gesture) on the "Add Biller" button of the UI, to instruct the migration module(s) to save this bill information and/or schedule a date and/or time when the bill is to be paid from the second account.

Figure 13F:
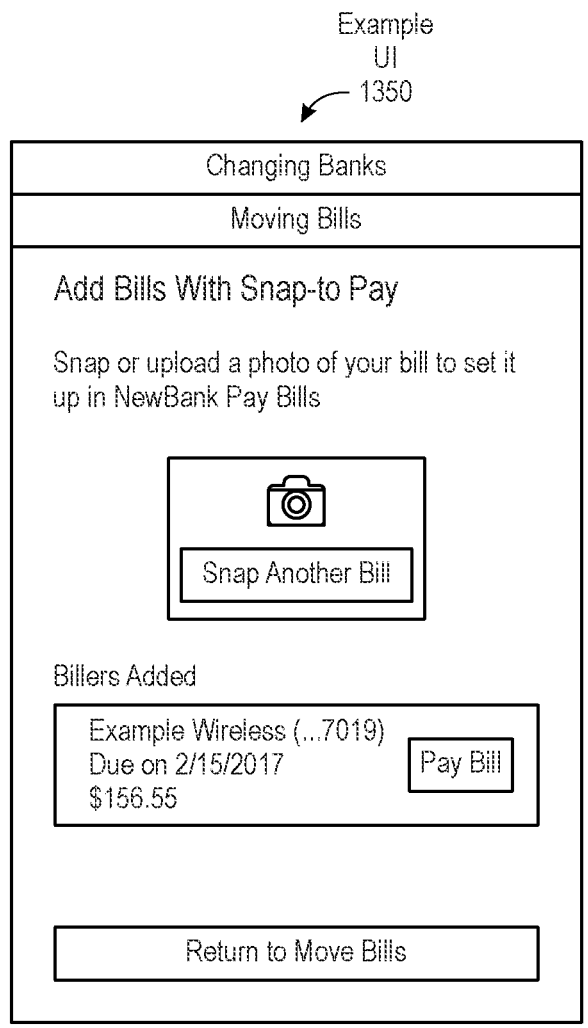

The UI may present example UI 1350 as shown in FIG. 13F, showing the billers already added through the Snap-to-Pay feature, and enabling the user 140 to request another bill to be image-captured and analyzed (e.g., "Snap Another Bill"). In some implementations, as shown in this example, the UI may provide a UI element (e.g., "Pay Bill") to enable the user 140 to request that a particular bill be paid. The UI may also enable the user 140 to specify when a bill is to be paid from the second account. As described above, in some implementations, the payment of the bill may be automatically scheduled based on the due date extracted from the image(s) of the bill.

Figure 14:
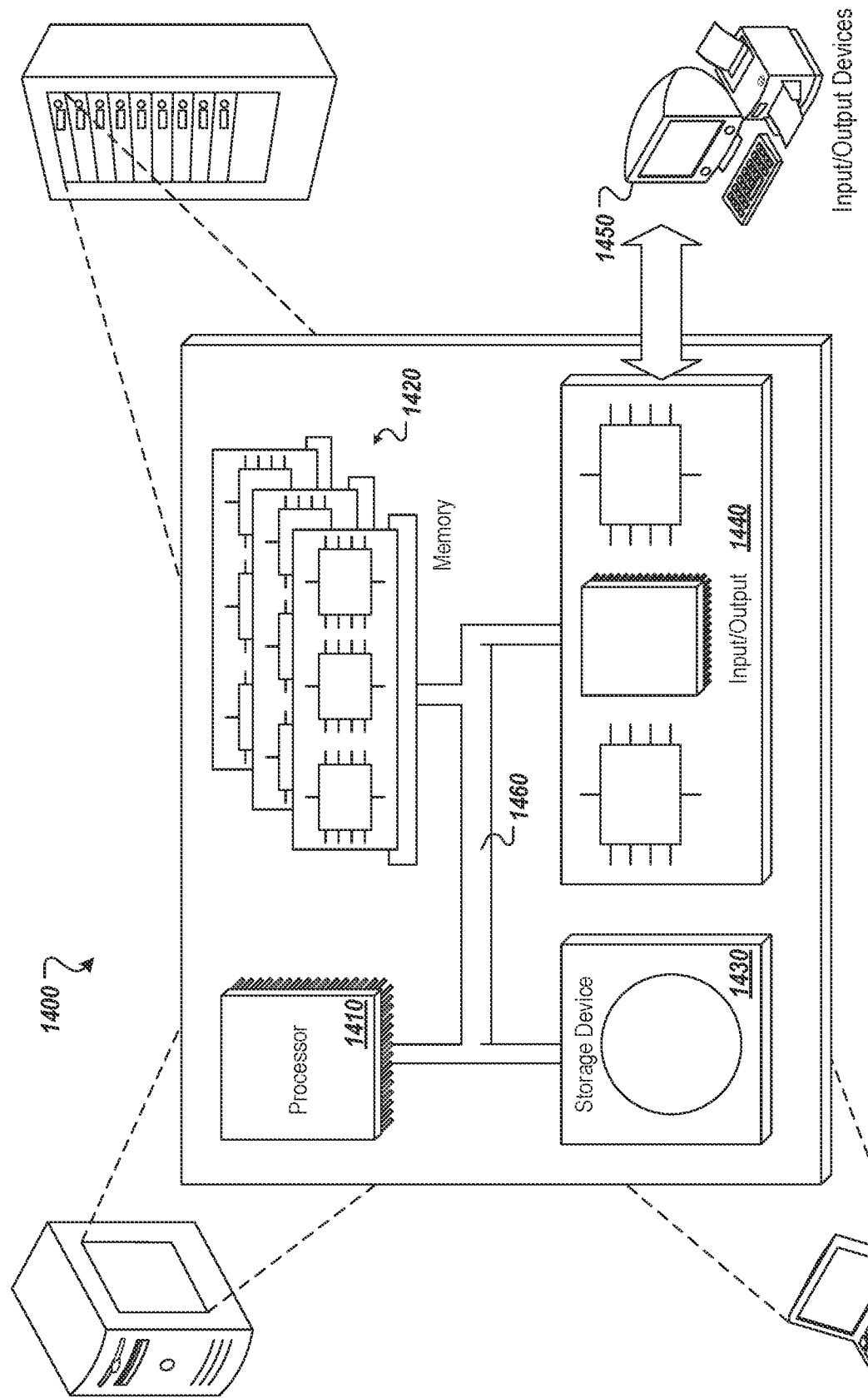
FIG. 14 depicts an example computing system, according to implementations of the present disclosure.

FIG. 14 depicts an example computing system, according to implementations of the present disclosure. The system 1400 may be used for any of the operations described with respect to the various implementations discussed herein. For example, the system 1400 may be included, at least in part, in the user device 138, the account migration device(s) 132, the account management device(s) 126A, the account management device(s) 126B, and/or other device(s) described herein. The system 1400 may include one or more processors 1410, a memory 1420, one or more storage devices 1430, and one or more input/output (I/O) devices 1450 controllable through one or more I/O interfaces 1440. The various components 1410, 1420, 1430, 1440, or 1450 may be interconnected through at least one system bus 1460, which may enable the transfer of data between the various modules and components of the system 1400.

The processor(s) 1410 may be configured to process instructions for execution within the system 1400. The processor(s) 1410 may include single-threaded processor(s), multi-threaded processor(s), or both. The processor(s) 1410 may be configured to process instructions stored in the memory 1420 or on the storage device(s) 1430. The processor(s) 1410 may include hardware-based processor(s) each including one or more cores. The processor(s) 1410 may include general purpose processor(s), special purpose processor(s), or both.

The memory 1420 may store information within the system 1400. In some implementations, the memory 1420 includes one or more computer-readable media. The memory 1420 may include any number of volatile memory units, any number of non-volatile memory units, or both volatile and non-volatile memory units. The memory 1420 may include read-only memory, random access memory, or both. In some examples, the memory 1420 may be employed as active or physical memory by one or more executing software modules.

The storage device(s) 1430 may be configured to provide (e.g., persistent) mass storage for the system 1400. In some implementations, the storage device(s) 1430 may include one or more computer-readable media. For example, the storage device(s) 1430 may include a floppy disk device, a hard disk device, an optical disk device, or a tape device. The storage device(s) 1430 may include read-only memory, random access memory, or both. The storage device(s) 1430 may include one or more of an internal hard drive, an external hard drive, or a removable drive.

One or both of the memory 1420 or the storage device(s) 1430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1400. In some implementations, the CRSM may include a data store that provides storage of computer-readable instructions or other information in a non-transitory format. The CRSM may be incorporated into the system 1400 or may be external with respect to the system 1400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1410 and the memory 1420 may be supplemented by, or incorporated into, one or more application-specific integrated circuits (ASICs).

The system 1400 may include one or more I/O devices 1450. The I/O device(s) 1450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1450 may also include one or more output devices such as a display, LED(s), an audio output device (e.g., a speaker), a printer, a haptic output device, and so forth. The I/O device(s) 1450 may be physically incorporated in one or more computing devices of the system 1400, or may be external with respect to one or more computing devices of the system 1400.

The system 1400 may include one or more 1/0 interfaces 1440 to enable components or modules of the system 1400 to control, interface with, or otherwise communicate with the 1/0 device(s) 1450. The I/O interface(s) 1440 may enable information to be transferred in or out of the system 1400, or between components of the system 1400, through serial communication, parallel communication, or other types of communication. For example, the I/O interface(s) 1440 may comply with a version of the RS-232 standard for serial ports, or with a version of the IEEE 1284 standard for parallel ports. As another example, the I/O interface(s) 1440 may be configured to provide a connection over Universal Serial Bus (USB) or Ethernet. In some examples, the I/O interface(s) 1440 may be configured to provide a serial connection that is compliant with a version of the IEEE 1394 standard.

The I/O interface(s) 1440 may also include one or more network interfaces that enable communications between computing devices in the system 1400, or between the system 1400 and other network-connected computing systems. The network interface(s) may include one or more network interface controllers (NICs) or other types of transceiver devices configured to send and receive communications over one or more networks using any network protocol.

Computing devices of the system 1400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device (s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input. In some instances, input and/or output may be received and/or provided through an augmented reality and/or virtual reality system.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system, comprising:
   at least one processor; and
   a memory communicatively coupled to the at least one processor, the memory storing instructions which, when executed, cause the at least one processor to perform operations comprising:
   receiving user bill data comprising bill information;
   identifying a portion of the bill information comprising a recurring charge of a plurality of recurring charges;
   displaying the portion of the bill information on a Graphical User Interface (GUI);
   receiving user input indicative of a modification to the portion of the bill information corresponding to the recurring charge;
   automatically scheduling a plurality of charge migrations from a first account to a second account based on the modification to the portion of the bill information;
   automatically scheduling a plurality of recurring payments for the plurality of recurring charges from the second account based on the plurality of charge migrations, wherein the plurality of recurring payments was previously made from the first account; and
   displaying a status of the plurality of charge migrations from the first account to the second account on the GUI, wherein the status is determined based on a schedule of the plurality of recurring payments and the plurality of recurring charges, and wherein the status comprises a percentage progress of the plurality of charge migrations.

2. The system of claim 1, wherein the GUI is configured to display one or more additional charges that have been identified as one or more possible recurring charges based on one or more semi-regular charges made to the first account or based on a location of one or more past charges made to the first account.

3. The system of claim 2, wherein the GUI is configured to receive additional user input confirming that the one or more additional charges correspond to one or more recurring charges of the plurality of recurring charges.

4. The system of claim 1, wherein the instructions cause the at least one processor to perform the operations comprising displaying a switch timeline that indicates one or more time periods when one or more portions of the plurality of charge migrations are scheduled to occur.

5. The system of claim 4, wherein the switch timeline is separated into one or more pay periods based on one or more payroll payments identified from an account history associated with the first account.

6. The system of claim 4, wherein the GUI is configured to receive an input at a selectable point on the switch timeline.

7. The system of claim 6, wherein the input is configured to cause the GUI to display a date and a summary of one or more charges on the date to be paid against the first account, the second account, or both.

8. The system of claim 1, wherein the instructions cause the at least one processor to perform the operations comprising displaying a first current balance of the first account, a second current balance of the second account, one or more bills to be paid from the first account, and one or more bills to be paid from the second account.

9. A method, comprising:
receiving, via at least one processor, user bill data comprising bill information;
identifying, via the at least one processor, a portion of the bill information comprising a recurring charge;
displaying, via the at least one processor, the portion of the bill information on a Graphical User Interface (GUI);
receiving, via the at least one processor, user input indicative of a modification to the portion of the bill information corresponding to the recurring charge;
automatically scheduling, via the at least one processor, a plurality of charge migrations from a first account to a second account based on the modification to the portion of the bill information;
automatically scheduling, via the at least one processor, a plurality of recurring payments for the plurality of recurring charges from the second account based on the plurality of charge migrations, wherein the plurality of recurring payments was previously made from the first account; and
displaying, via the at least one processor, a status of the plurality of charge migrations from the first account to the second account on the GUI, wherein the status is determined based on a schedule of the plurality of recurring payments and the plurality of recurring charges, and wherein the status comprises a percentage progress of the plurality of charge migrations.

10. The method of claim 9, wherein the status of the plurality of charge migrations from the first account to the second account on the GUI comprises a switch timeline that indicates one or more time periods when one or more portions of the plurality of charge migrations are scheduled to occur.

11. The method of claim 10, wherein the status of the plurality of charge migrations from the first account to the second account on the GUI comprises displaying that a first charge migration of the plurality of charge migrations has completed based on detecting that at least one recurring deposit is made into the second account instead of the first account.

12. The method of claim 10, comprising initiating, by the at least one processor, a first transfer of an amount of funds comprising:
transferring the amount of funds from the first account to the second account based on the schedule, wherein the amount of funds corresponds to the at least one recurring charge;
detecting, by the at least one processor, that at least one recurring deposit is made to the second account; and
requesting, by the at least one processor, a second transfer of remaining funds from the first account to the second account in response to detecting that the at least one recurring deposit is made to the second account.

13. The method of claim 9, wherein the GUI is configured to display one or more additional charges that have been identified as one or more possible recurring charges based on one or more semi-regular charges made to the first account or based on a location of one or more past charges made to the first account.

14. The method of claim 13, wherein the GUI is configured to receive additional user input confirming that the one or more additional charges correspond to one or more recurring charges of the plurality of recurring charges.

15. A non-transitory computer-readable medium comprising computer-executable instructions that, when executed, are configured to cause a processor to perform operations comprising:
receiving user bill data comprising bill information;
identifying a portion of the bill information comprising a recurring charge of a plurality of recurring charges;
displaying the portion of the bill information on a Graphical User Interface (GUI);
receiving user input indicative of a modification to the portion of the bill information corresponding to the recurring charge;
automatically scheduling a plurality of charge migrations from a first account to a second account based on the modification to the portion of the bill information;
automatically scheduling a plurality of recurring payments for the plurality of recurring charges from the second account based on the plurality of charge migrations, wherein the plurality of recurring payments was previously made from the first account; and
displaying a status of the plurality of charge migrations from the first account to the second account on the GUI, wherein the status is determined based on a schedule of the plurality of recurring payments and the plurality of recurring charges, and wherein the status comprises a percentage progress of the plurality of charge migrations.

16. The non-transitory computer-readable medium of claim 15, wherein the instructions are configured to cause the processor to perform the operations comprising causing the GUI to display a date and a summary of one or more charges on the date to be paid against the first account, the second account, or both.

17. The non-transitory computer-readable medium of claim 16, wherein the instructions are configured to cause the processor to perform the operations comprising receiving additional user input indicating that at least one of the one or more charges on the date to be paid against the first account, the second account, or both corresponds to a false identification of a recurring charge of the plurality of recurring charges.

18. The non-transitory computer-readable medium of claim 17, wherein the instructions are configured to cause the processor to perform the operations comprising excluding at least one of the one or more charges from the at least one recurring charge in response to receiving the additional user input indicating that at least one of the one or more charges corresponds to false identification of the recurring charge.

19. The non-transitory computer-readable medium of claim 18, wherein the instructions are configured to cause the GUI to display a switch timeline, wherein the switch timeline is separated into one or more pay periods based on one or more payroll payments identified from an account history associated with the first account.

20. The non-transitory computer-readable medium of claim 19, wherein a user input of a point on the switch timeline is configured to cause the GUI to display a date and a summary of one or more charges on the date to be paid against the first account, the second account, or both.

* * * * *